(12) United States Patent
Fraioli et al.

(10) Patent No.: US 11,674,330 B2
(45) Date of Patent: *Jun. 13, 2023

(54) RAPIDLY DEPLOYABLE AIR SUPPORTED STRUCTURE SYSTEMS AND RELATED METHODS

(71) Applicants: Donato Joseph Fraioli, Pound Ridge, NY (US); Denise Fraioli, Pound Ridge, NY (US)

(72) Inventors: Donato Joseph Fraioli, Pound Ridge, NY (US); Denise Fraioli, Pound Ridge, NY (US)

(*) Notice: Subject to any disclaimer, the term of this patent is extended or adjusted under 35 U.S.C. 154(b) by 193 days.

This patent is subject to a terminal disclaimer.

(21) Appl. No.: 17/158,185

(22) Filed: Jan. 26, 2021

(65) Prior Publication Data
US 2021/0214963 A1    Jul. 15, 2021

Related U.S. Application Data

(63) Continuation of application No. 16/664,658, filed on Oct. 25, 2019, now Pat. No. 10,900,250, which is a (Continued)

(51) Int. Cl.
*E04H 15/22* (2006.01)
*E04B 1/34* (2006.01)
(Continued)

(52) U.S. Cl.
CPC .......... *E04H 15/22* (2013.01); *E04B 1/3408* (2013.01); *E04B 1/34352* (2013.01); *E04B 1/34384* (2013.01); *E04H 2015/206* (2013.01)

(58) Field of Classification Search
CPC .............. E04H 15/22; E04H 2015/206; E04H 2015/203; E04H 15/20; E04H 15/02; E04B 1/3408; E04B 1/34352; E04B 1/34384
See application file for complete search history.

(56) References Cited

U.S. PATENT DOCUMENTS 2,910,994 A ‡ 11/1959 Joy .......................... E04H 15/22
                                                      52/2.11
3,161,553 A ‡ 12/1964 Visser .................... B29C 70/10
                                                      52/2.21
(Continued)

FOREIGN PATENT DOCUMENTS

EP         1229188         ‡ 11/2001

OTHER PUBLICATIONS

International Search Report and Written Opinion issued in PCT/US2018/029422, dated Aug. 28, 2018, 8 pages.‡

(Continued)

*Primary Examiner* — Rodney Mintz
(74) *Attorney, Agent, or Firm* — Heslin Rothenberg Farley & Mesiti PC; Kristian E. Ziegler, Esq.

(57) ABSTRACT

Transportable and rapidly deployable air supported structure systems and related methods are disclosed. The air supported structure systems include at least one transportable container. The systems also include a flexible outer membrane configured to couple to a base in a substantially air-tight manner. The systems further include at least one air handling mechanism contained within the at least one container configured to force air between the outer membrane and the base to form an enclosure therebetween via internal air pressure. The systems are configurable between a packaged state with the outer membrane contained within the at least one container, and a deployed state with the outer membrane being coupled to the base and the at least one air handling mechanism forming the enclosure via the internal air pressure. The at least one container may form a portion of the base and/or provide for ingress and egress with the enclosure.

19 Claims, 20 Drawing Sheets

Related U.S. Application Data continuation-in-part of application No. PCT/US2018/029422, filed on Apr. 25, 2018.

(60) Provisional application No. 62/489,675, filed on Apr. 25, 2017.

(51) Int. Cl.
  *E04B 1/343* (2006.01)
  *E04H 15/20* (2006.01)

(56) References Cited

U.S. PATENT DOCUMENTS

| | | | | |
|---|---|---|---|---|
| 3,247,627 A ‡ | 4/1966 | Bird | ............... | E04H 15/20 |
| | | | | D25/19 |
| 3,497,606 A ‡ | 2/1970 | Andrews | ............... | E04H 15/20 |
| | | | | 174/379 |
| 3,801,093 A ‡ | 4/1974 | Jones, III | ............... | E04H 15/22 |
| | | | | 472/94 |
| 4,164,829 A ‡ | 8/1979 | Sadler | ............... | E04H 1/125 |
| | | | | 135/117 |
| 4,696,133 A ‡ | 9/1987 | Wren | ............... | E04H 15/22 |
| | | | | 52/2.17 |
| 5,331,991 A ‡ | 7/1994 | Nilsson | ............... | A62B 13/00 |
| | | | | 135/93 |
| 7,695,049 B2 ‡ | 4/2010 | Colborne | ............... | B60P 3/14 |
| | | | | 135/88.13 |
| 7,806,951 B2 ‡ | 10/2010 | Zimmerman | ............... | B01D 46/02 |
| | | | | 454/238 |
| 8,555,559 B2 ‡ | 10/2013 | DiGregory | ............... | E04B 1/3445 |
| | | | | 52/79.5 |
| 8,622,066 B2 ‡ | 1/2014 | Dolsby | ............... | E04B 1/3444 |
| | | | | 52/64 |
| 8,763,326 B2 ‡ | 7/2014 | Takeshima | ............... | E04H 9/028 |
| | | | | 52/236.1 |
| 8,858,308 B2 ‡ | 10/2014 | Chelf | ............... | F24F 13/08 |
| | | | | 454/251 |
| 8,955,258 B2 ‡ | 2/2015 | Jacques | ............... | E04B 1/34357 |
| | | | | 52/2.18 |
| 9,169,633 B2 ‡ | 10/2015 | DiGregory | ............... | E04B 1/344 |
| 9,439,329 B1 ‡ | 9/2016 | Towner | ............... | H05K 7/20745 |
| 9,458,623 B2 ‡ | 10/2016 | Duncan | ............... | B65D 90/026 |
| 9,970,207 B2 ‡ | 5/2018 | Wasson | ............... | E04H 15/20 |
| 10,024,562 B2 ‡ | 7/2018 | Chelf | ............... | F24F 7/007 |
| 10,046,905 B2 ‡ | 8/2018 | Downey | ............... | B01D 21/0003 |
| 10,098,263 B2 ‡ | 10/2018 | Towner | ............... | H05K 7/1497 |
| 10,219,961 B2 ‡ | 3/2019 | Patel | ............... | E04H 1/1205 |
| 10,900,250 B2 * | 1/2021 | Fraioli | ............... | E04H 15/02 |
| 2002/0083653 A1 ‡ | 7/2002 | Hilbert | ............... | E04H 15/20 |
| | | | | 52/2.17 |
| 2003/0074852 A1 ‡ | 4/2003 | Knabenschuh | ............... | E04B 1/68 |
| | | | | 52/396.04 |
| 2008/0034679 A1 ‡ | 2/2008 | Ballard | ............... | E04H 1/1205 |
| | | | | 52/79.6 |
| 2009/0320380 A1 ‡ | 12/2009 | Chelf | ............... | A01G 9/242 |
| | | | | 52/2.11 |
| 2010/0044369 A1 ‡ | 2/2010 | Toepfer | ............... | E04H 1/1277 |
| | | | | 220/1.5 |
| 2010/0146868 A1 ‡ | 6/2010 | Lukasiewicz | ............... | E04H 15/18 |
| | | | | 52/741 |
| 2012/0131857 A1 ‡ | 5/2012 | Ross-da Silva | ............... | E04H 15/20 |
| | | | | 52/2.18 |
| 2012/0285104 A1 ‡ | 11/2012 | Digregory | ............... | E04B 1/3445 |
| | | | | 52/79.5 |
| 2014/0047778 A1 ‡ | 2/2014 | DiGregory | ............... | E04B 1/344 |
| | | | | 52/2.25 |
| 2014/0300174 A1 ‡ | 10/2014 | Maust | ............... | E04H 15/20 |
| | | | | 299/12 |
| 2015/0099451 A1 ‡ | 4/2015 | Chelf | ............... | F24F 7/007 |
| | | | | 454/255 |
| 2015/0315776 A1 ‡ | 11/2015 | Duncan | ............... | E04B 1/3442 |
| | | | | 52/66 |
| 2016/0318706 A1 ‡ | 11/2016 | Downey | ............... | B01D 21/0003 |
| 2016/0374233 A1 ‡ | 12/2016 | Towner | ............... | H05K 7/1497 |
| 2017/0058553 A1 ‡ | 3/2017 | Day | ............... | E04H 15/02 |
| 2017/0081867 A1 ‡ | 3/2017 | Wasson | ............... | E04H 15/20 |
| 2017/0156961 A1 ‡ | 6/2017 | Patel | ............... | A61G 10/005 |
| 2017/0275995 A1 ‡ | 9/2017 | Maust | ............... | E21F 11/00 |
| 2020/0056396 A1 * | 2/2020 | Fraioli | ............... | E04B 1/34384 |

OTHER PUBLICATIONS

International Preliminary Report on Patentability for International Application No. PCT/US2018/029422, dated Oct. 29, 2019, 7 pages, International Bureau of WIPO.‡

\* cited by examiner
‡ imported from a related application

RAPIDLY DEPLOYABLE AIR SUPPORTED STRUCTURE SYSTEMS AND RELATED METHODS

CROSS-REFERENCE TO RELATED APPLICATION

This present application is a continuation of U.S. application Ser. No. 16/664,658, filed on Oct. 25, 2019, and entitled Rapidly Deployable Air Supported Structure Systems and Related Methods, which is a continuation-in-part of International Application No. PCT/US2018/029422, filed on Apr. 25, 2018, and entitled Rapidly Deployable Air Supported Structure Systems and Related Methods, which claims the benefit of U.S. Provisional Patent Application No. 62/489,675, filed on Apr. 25, 2017, the contents of which are hereby expressly incorporated herein by reference in their entireties.

FIELD OF THE DISCLOSURE

The present disclosure generally relates to air supported fabric structures, and more particularly to transportable and rapidly deployable air supported fabric structure systems.

BACKGROUND

A wide variety of portable shelters are currently used, such as tents and similar structures, inflatable structures, geodesic domes, and various types of prefabricated structures. Tents have the advantage of being quick to erect, while pre-fabricated structures have the advantage of being comparatively sturdier, more permanent, and more capable of withstanding weather. The ideal portable shelter would be free-standing, quick and easy to erect, and sturdy and capable of withstanding inclement weather.

One type of semi-permanent structures are air supported structures. These structures are generally comprised of a main or outer sheet-like flexible membrane or skin which defines an enclosure when air within the air supported structure is at a higher pressure than the air pressure outside of the air supported structure. The outer surface of the outer flexible membrane forms an exterior surface of the structures. The outer flexible membrane may be formed from a plurality of panels which are joined to each other to form a dome envelope of any size and shape.

The outer membrane of air supported structures is typically made from a strong, durable, light-weight material that is at least substantially air-tight and resistant to weather (e.g., water-tight) and pollutants. Additionally, it is desirable that the material forming the outer membrane is flexible and configured such that adjacent panels can be coupled together to form a relatively strong composite structure. The outer membrane is typically affixed to the ground and/or to a foundation that extends from the ground in a substantially airtight manner to form the enclosure therebetween.

The internal air pressure within air supported structures is typically created by forcing air, such as the atmosphere about the structure, into the enclosure formed between the outer membrane and the ground and/or foundation. In this way, the internal air pressure within the enclosure is formed and maintained above the local atmospheric air pressure to position the outer membrane in an extended positioned over the ground and/or foundation. Because of leakage of the air/atmosphere within the enclosure, such as between the outer membrane and the ground and/or foundation, and/or through openings of the outer membrane that allow for ingress and egress, the internal air pressure may be monitored and maintained by regularly forcing sufficient air into the enclosure. Air moving mechanisms (e.g., blowers, fans, heat exchangers, plenums, ducts, and vents) are typically utilized to create and maintain the internal pressure within the enclosure of air supported structures. The air moving mechanisms are also typically utilized to heat and/or cool the enclosure of air supported structures, if needed or desired.

Although air supported structures are sturdy structures that are capable of withstanding inclement weather and/or environmental conditions, and can be erected quicker than permanent structures, they are not typically utilized as portable shelters or structures as they can be more time consuming to construct as compared to many other temporary structures. For example, the air moving mechanisms that create and maintain the internal air pressure of air supported structures, and potentially heat and/or cool the enclosure, can be complicated and time consuming to obtain, install and/or calibrate. Further, the air moving mechanisms of air supported structures are typically designed for specific air supported structures, and are normally tied into local utilities and installed in a permanent or semi-permanent fashion. Still further, air supported structures are not utilized as portable shelters or structures as they are usually designed and constructed for specific locations and specific uses, and are thereby constructed via specialized "one-off" components and configurations (such as the design of the outer membrane and the air moving mechanisms).

Thus, a need exists for portable and rapidly deployable air supported structure systems that can be utilized as a portable shelter/structure or for any other purpose or need.

While certain aspects of conventional technologies have been discussed to facilitate disclosure, the Applicant in no way disclaims these technical aspects, and it is contemplated that the claimed inventions may encompass one or more conventional technical aspects.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

The present disclosure may address one or more of the problems and deficiencies of the art discussed above. However, it is contemplated that the present disclosure may prove useful in addressing other problems and deficiencies in any number of technical areas. Therefore, the claimed inventions and present disclosure should not necessarily be construed as limited to addressing any of the particular problems or deficiencies discussed herein.

Briefly, the present disclosure satisfies the need for portable and rapidly deployable (and packageable) air supported structures that can be utilized to form at least one portable shelter/structure or for any other use, purpose or need. The air supported structure systems of the present disclosure are configurable between two states: a closed or packaged state and a deployed or open state. In the closed or packaged state, the system may be contained (e.g., fully contained) within at least one container or enclosure (such as within two or more containers). The at least one container of the system may be sized and configured to be relatively transportable or portable such that the system can be transported to any location in the closed state. For example, in some embodiments the at least one container may be configured as a cargo or shipping container, tractor-trailer container, rail container or any other configuration that facilitates transportation by available or conventional shipping channels and/or modes.

At least any necessary and specialized, specific and/or non-readily available components or mechanisms of at least one air supported structure may be contained within the at least one container of the system in the closed or packaged state. In this way, when the at least one container is positioned at a location at which an air supported structure is needed or desired, the components or mechanisms of an air supported structure can be at least partially removed from the at least one container and deployed to form an enclosure. For example, at least a first container may include the outer membrane (and potentially one or more inner liners) of the air supported structure in the packaged state. The outer membrane may be configured to relatively quickly and easily couple to a base, such as the ground at the location, a foundation structure and/or the at least one container.

In some embodiments, at least one container may be utilized as a foundation or frame such that the outer member is coupled to and extends from the at least one container in the deployed state (i.e., when the enclosure is formed). In such embodiments, the at least one container that is coupled to the outer membrane may be the at least one container that contained the outer membrane in the packaged state and/or at least one other container that did not contain the outer membrane in the packaged state. In some embodiments, the combination of the at least one container and the outer membrane may form the enclosure (or at least part of the enclosure). Further, the at least one container may be utilized, as or provide for, ingress into the enclosure and egress out of the enclosure (in the deployed state). For example, the at least one container may include a passageway that is in selective communication with the enclosure to provide for ingress and egress. The passageway may be in direct selective communication or indirect selective communication with the enclosure. For example, in some embodiments an intermediate portion may extend between the outer membrane and the at least one container (e.g., an air lock) such that the at least one container is not directly coupled to the outer member but still provides for ingress and egress. In this way, the at least one passageway of the at least one container may be in direct communication or indirect communication with the enclosure.

In addition to containing the outer membrane (and potentially one or more inner liners), the at least one container may include an air handling mechanism of the air supported structure in the closed or packaged state of the system. The air handling mechanism and the outer membrane may be contained within a same container in the closed or packaged state of the system or in differing containers. The air handling mechanism may be configured as an air pressure creation mechanism that creates and/or maintains the internal air pressure within the enclosure of the air supported structure in the deployed or open state of the system. For example, the air handling mechanism may include a blower, fan, turbine, pump or any other air movement or pressure creation mechanism that is configured to force air into the enclosure in the deployed or open state to form and/or maintain the internal air pressure therein, such as when the outer membrane is unpacked from the at least one container and affixed to the base (such as the ground, foundation and/or at least one container). In some embodiments, the air handling mechanism may be configured to selectively introduce varying amounts of additional air into the enclosure (e.g., from the atmosphere about the air supported structure) that are necessary to maintain the internal air pressure over time (such as within an acceptable internal air pressure range).

The air handling mechanism may also be configured as an air treatment mechanism that selectively heats, cools and/or treats the air or atmosphere within the enclosure. For example, the air handling mechanism may include an air heating mechanism configured to provide relatively warm air into the enclosure, an air conditioning mechanism configured to provide relatively cool (and potentially dry) air into the enclosure, and/or an air treatment mechanism configured to clean, condition, treat or otherwise improve the quality or composition of the air within the enclosure to suit a particular desire and/or need. The air handling mechanism may heat, cool and/or treat the air of the enclosure by heating, cooling and/or treating air that the air handling mechanism forces into the enclosure to create and/or maintain the internal air pressure of the air supported structure in the deployed or open state of the system. In some such embodiments, the air handling mechanism may be configured to recirculate air within the enclosure and supplement it with any additional air necessary to maintain the internal air pressure, and at least a portion of such recirculating and/or supplemental air may be selectively heated, cooled and/or treated by the air handling mechanism.

In some embodiments, the at least one container may include at least one electrical power source configured to provide electrical power to at least the air handling mechanism. The electrical power source may include at least one solar panel, generator, wind turbine, battery, grid-based power input/connection and/or any other electrical power generation mechanism that is configured to generate, produce or otherwise output electrical power. In addition to providing power for the air handling mechanism, the at least one electrical power source may provide electrical power for other systems of the air supported structure system and/or for any use or purpose.

When an air supported structure is needed at a desired location, the system may be transported in the closed or packed state to the location (i.e., the at least one container and its contents may be transported). Once the system is positioned at, or proximate to, the desired location, the system may be relatively rapidly deployed or erected into the unpacked or deployed state. For example, the at least one container may be at least partially opened and the outer membrane (and potentially at least one liner) stored therein in the closed state may be at least substantially removed from the at least one container. The unpacked outer membrane may then be attached to a base, such as the ground, a foundation and/or the at least one container, in a substantially airtight manner. As noted above, at one or more container of the system may be utilized as a portion of the base. In such an embodiment, the outer membrane may be attached to the at least one container in a substantially airtight manner (if not previously affixed thereto). Once the outer membrane is unpacked from the at least one container of the system and affixed to the base, such as affixed to the ground and/or a foundation and to at least one container, the air handling mechanism contained (at least partially) within the at least one container may be utilized to force air between the outer membrane and the base to create an internal air pressure that is greater than the air pressure of the atmosphere exterior to or about the outer membrane. In this way, the outer membrane (and any inner liners or hardware attached thereto) may be elevated or lifted (and maintained in such a position) above the base via the internal air pressure to form the enclosure of the air supported structure. The at least one container may include a passageway extending therethrough that is in selective communication with the enclosure to provide for ingress and egress.

Since the outer membrane and the air handling mechanism of the system (and potentially a power source configured to power at least the air handling mechanism) is contained within the at least one container in the packed or closed state, the air supported structure may be rapidly activated or deployed from the packed or closed state into the open or deployed state. The system may thereby be a self-contained air supported structure system that does not require additional components or mechanisms to form and maintain the air supported structure (i.e., the enclosure formed thereby) from the packed or closed state. Further, as noted above, the at least one container may contain other mechanisms or hardware in the packed state that may be utilized to form and/or enhance the air supported structure in the deployed state beyond the outer membrane and the air pressure creation mechanism. For example, in the packaged state of the system the at least one container may contain mechanisms configured to couple the outer membrane to the base in a substantially airtight manner in the deployed state, such as to the ground, a foundation and/or the at least one container. As another example, in the packaged state of the system the at least one container may contain at least one power source configured to provide electrical power to components of the air supported structure and/or other uses (e.g., within the enclosure and/or at least one container). In yet another example, in the packaged state of the system the at least one container may contain heating, ventilation and/or air conditioning (HVAC) mechanisms associated with the air handling mechanism that are configured to condition the air within the enclosure in the deployed state. As a further example, in the packaged state of the system, the at least one container may include at least one passageway and/or an airlock that is configured to be in selective communication with the enclosure in the deployed state to provide egress and ingress. In some such embodiments, the at least one passageway and/or airlock may be accessed through the at least one container in the deployed state.

After the air supported structure is erected in the open or deployed state of the system, the formed enclosure may be utilized for any use or purpose. For example, the air supported structure may be utilized as a portable and rapidly deployable shelter, storage structure, entertainment structure, agricultural structure, medical facility, military facility, etc. In some embodiments, the air supported structure may be utilized as a dwelling, shelter or other structure/enclosure when adequate structures (e.g., sturdy and safe structures) are not available, too time consuming and/or expensive to construct, or when only a temporary structure is desired or needed. For example, the air supported structure may be utilized in remote locations. As another example, the air supported structure may be utilized during and/or after natural disasters or other environmental situations which are dangerous, unhealthy and/or uncomfortable. As a further example, the air supported structure may be utilized when an environment is not suitable for agriculture (as the environment within the enclosure may be controlled and suitable for agriculture). As yet another example, the air supported structure may be utilized during military operations. However, as noted above, the air supported structure formed by the air supported structure system in the deployed state may be utilized for any use or purpose.

In one aspect, the present disclosure provides an air supported structure system comprising at least one container and a flexible outer membrane configured to couple to a base in a substantially air-tight manner. The system further comprises at least one air handling mechanism contained within the at least one container configured to force air between the outer membrane and the base to form and/or maintain an enclosure therebetween via internal air pressure. The system is reconfigurable between a packaged state with the outer membrane at least partially contained within the at least one container, and a deployed state with the outer membrane being coupled to the base in a substantially air-tight manner and the at least one air handling mechanism forming and/or maintaining the enclosure via the internal air pressure.

In another aspect, the present disclosure provides a method of forming an air supported structure that forms an enclosure via internal pressured air. The method comprises transporting at least one container of an air supported structure system in a packaged state to a location. In the packaged state, the at least one container contains at least one air handling mechanism and a flexible outer membrane configured to couple to a base. The method further comprises at least partially removing the outer membrane from within the at least one container. The method also comprises coupling the outer membrane to the base in a substantially air-tight manner. The method further comprises forcing air between the outer membrane and the base via the at least one air handling mechanism to form and/or maintain the enclosure therebetween via internal air pressure.

These and other features and advantages of the present disclosure will become apparent from the following detailed description of the various aspects of the present disclosure taken in conjunction with the appended claims and the accompanying drawings.

BRIEF DESCRIPTION OF THE DRAWINGS

These and other features, aspects, and advantages of the present disclosure will become better understood when the following detailed description is read with reference to the accompanying drawings, which are not necessarily drawn to scale and in which like reference numerals represent like aspects throughout the drawings, wherein.

DETAILED DESCRIPTION

Figure 1:
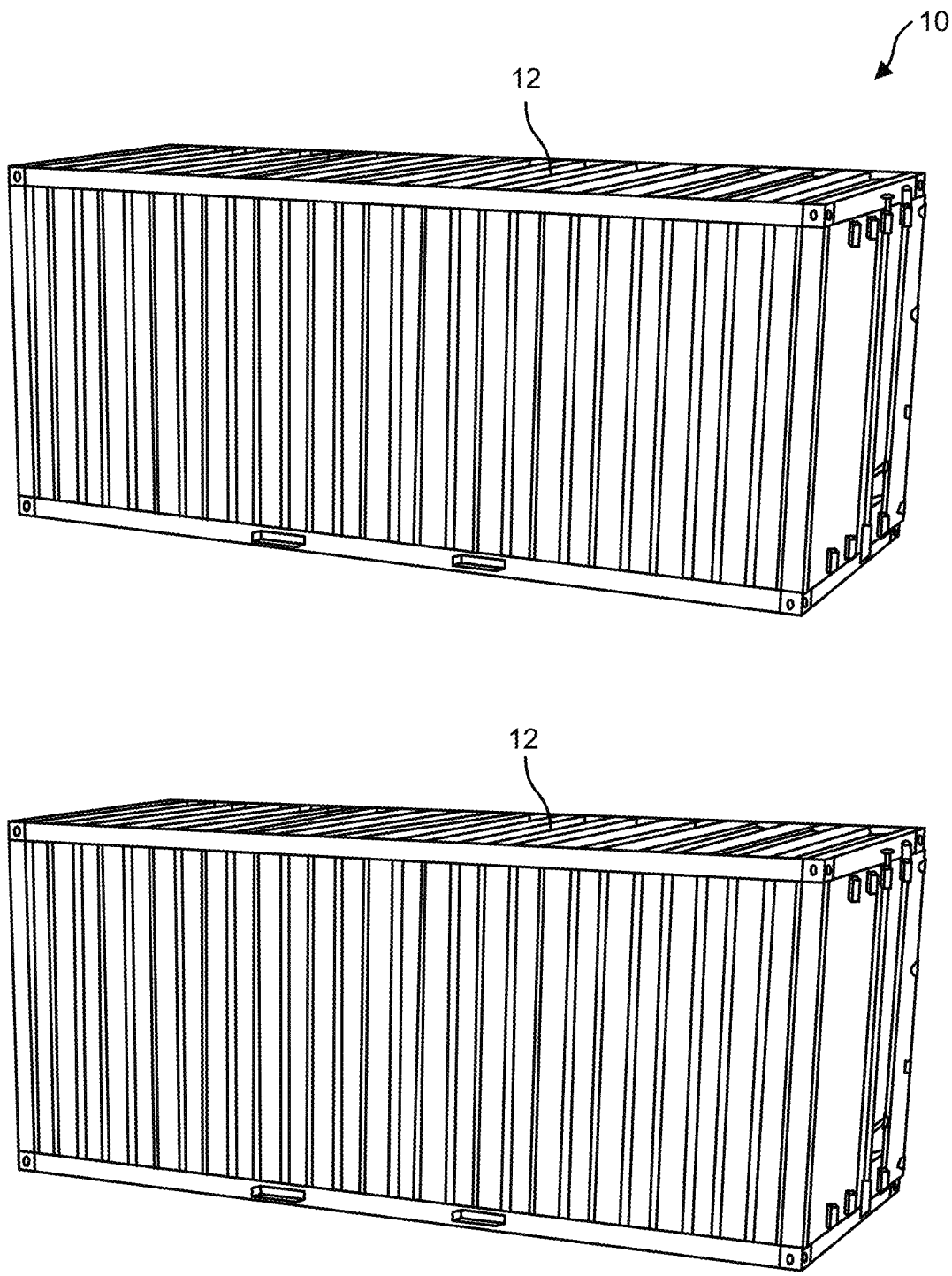
FIG. 1 is perspective view of an air supported structure system in a packed state according to the present disclosure.
Figure 2:
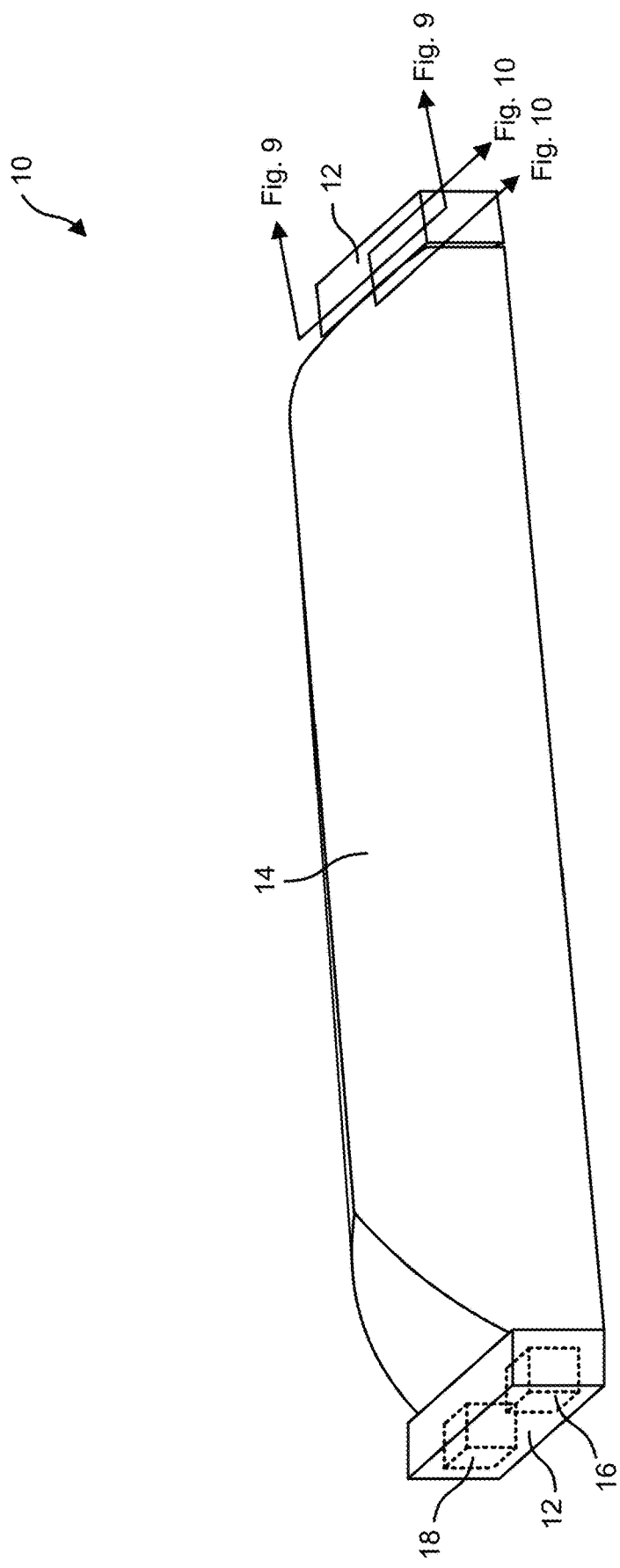
FIG. 2 is a perspective view of the air supported structure system of FIG. 1 in a deployed state forming an air supported structure according to the present disclosure.
Figure 3:
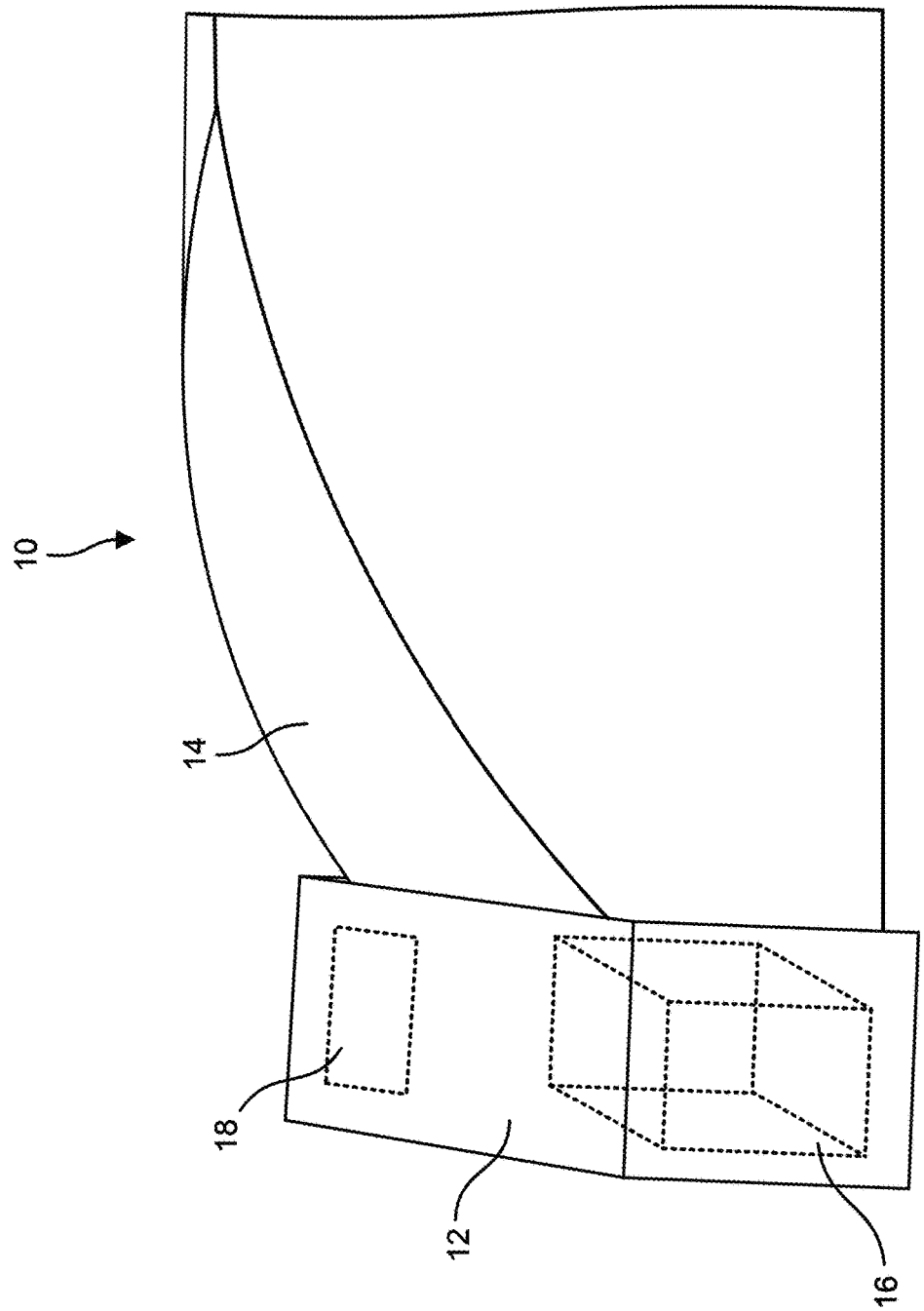
FIG. 3 is an enlarged perspective view of a portion of the air supported structure system of FIG. 2.
Figure 4:
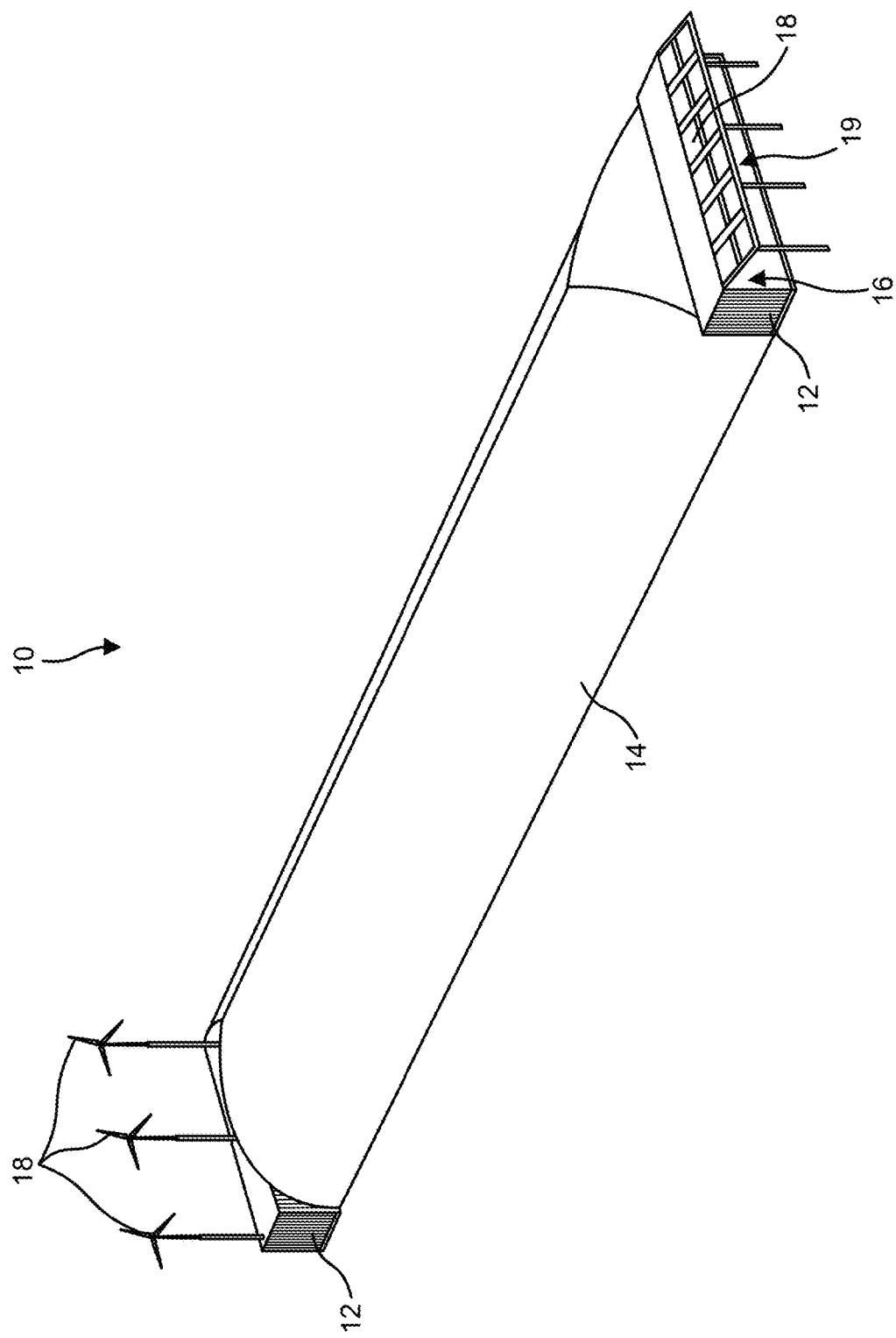
FIG. 4 is a perspective view of the air supported structure system of FIG. 2.
Figure 5:
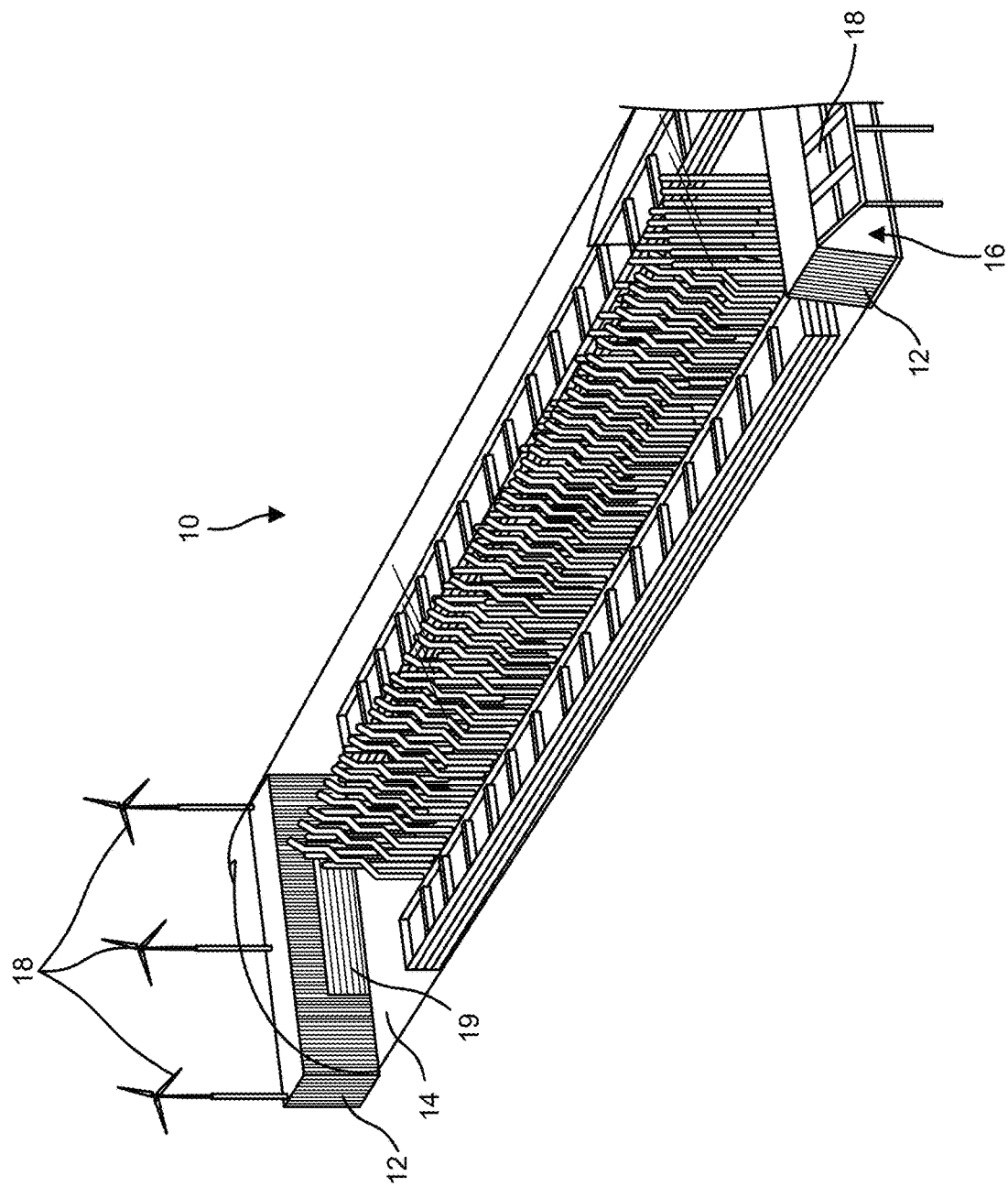
FIG. 5 is a perspective view of the air supported structure system of FIG. 2 illustrating the interior of the enclosure.
Figure 6:
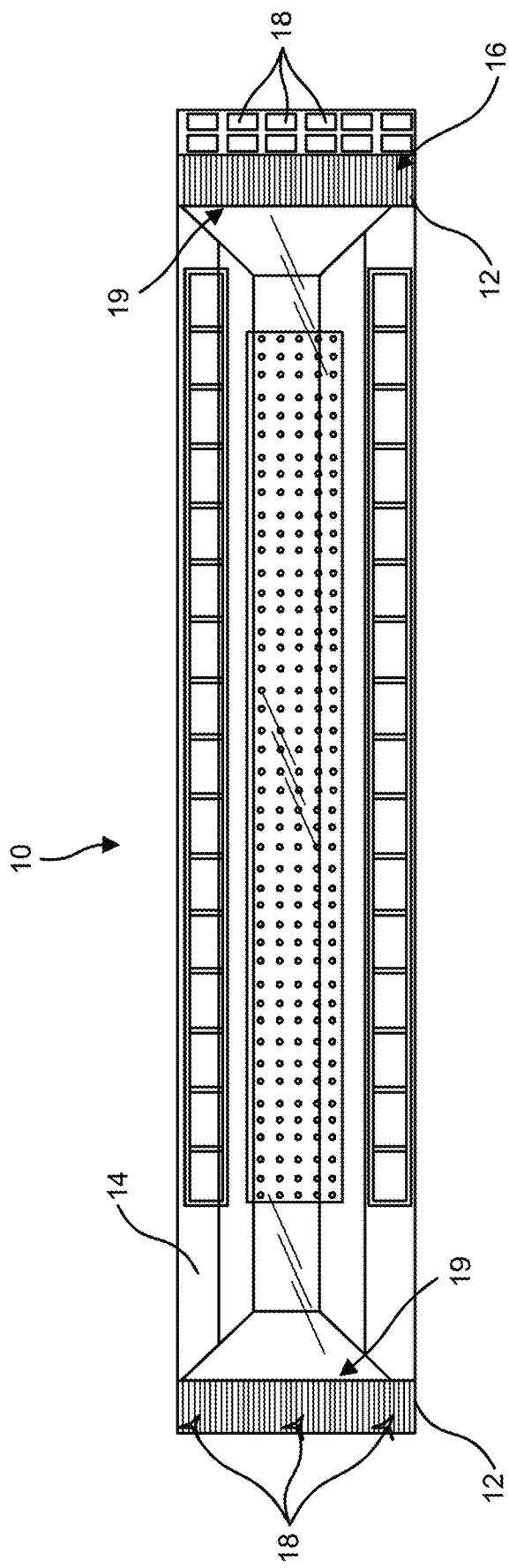
FIG. 6 is a top view of the air supported structure system of FIG. 2 illustrating the interior of the enclosure.
Figure 7:
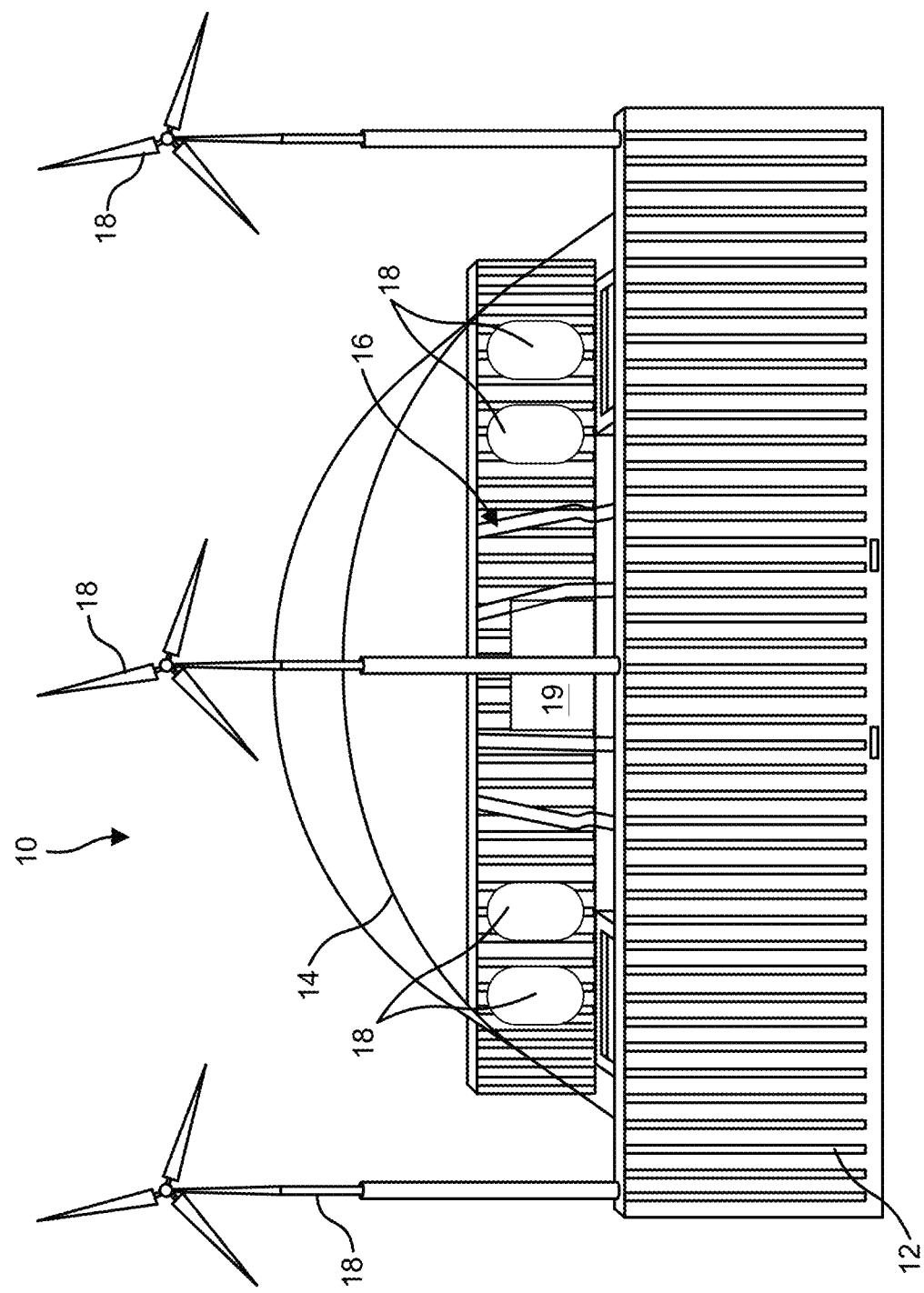
FIG. 7 is a left end view of the air supported structure system of FIG. 2.

Aspects of the present disclosure and certain examples, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one example" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein and unless otherwise indicated, the term "entirety" (and any other form of "entire") means at least a substantial portion, such as at least 95% or at least 99%. The term "entirety" (and any other form of "entire"), as used herein, is thereby not limited to 100%, unless otherwise indicated. As used herein, the term "layer" may be comprised of, but is not limited to, a single continuous body of material unless otherwise noted. For example, a "layer" may include multiple sub-layers that may be the same or differing materials, and/or may include coatings, adhesives, and the like.

The present disclosure provides transportable and rapidly deployable air supported structure systems and related methods. The systems store at least the major or primary components of an air supported structure within at least one container (i.e., within a single container or in a plurality of containers) in a packaged state of the system, which can be transported to any location at which an air supported structure is needed or desired. The air supported structure is relatively quickly and easily deployable into a deployed state from the at least one container utilizing the components stored within the at least one container to form at least one air supported structure as a sturdy, free standing enclosure. Once formed, the enclosure may be utilized for any use or purpose, and may be maintained for any amount of time. If desired, the air supported structure may be disassembled and repackaged into the at least one container (i.e., transitioned from the deployed state to the packaged state of the system). In this way, the air supported structure may be repackaged and stored within the at least one container, and then re-deployed at a later date in the same location or transported to a different location for redeployment.

Air supported structure systems 10 and related methods of the present disclosure are described with reference to exemplary systems illustrated in FIGS. 1-11. The systems 10 shown in FIGS. 1-11 are merely illustrative, however, and other embodiments or configurations may equally be employed in accordance with the spirit and scope of the present disclosure.

As shown in FIG. 1, in some embodiments the transportable and rapidly deployable air supported structure system 10 and related methods may include a closed or packaged state in which at least any necessary and specialized, specific or non-readily available components or mechanisms of at least one air supported structure are contained within at least one container 12. As shown in FIG. 1, in some embodiments the system 10 may include a plurality of containers 12, such as at least a pair of containers. In some embodiments, as shown in FIG. 1, at least some of the primary components or mechanisms necessary to erect or deploy the air supported structure and form the enclosure in an open or deployed state of the system 10 are contained within the at least one container 12 in the packaged state, such as at least an outer membrane 14 least one container 12 is positioned at a location at which an air supported structure is needed or desired, the components or mechanisms of an air supported structure can be removed from the at least one container 12 and deployed to form the enclosure. For example, at least a first container 12 may include the outer membrane 14 (and potentially one or more inner liners) of the air supported structure in the packaged state. The outer membrane 14 may be configured to relatively quickly and easily couple to a base (e.g., the ground, a foundation and/or the at least one container 12), and the internal air pressure may be created therebetween via the at least one air handling mechanism 16.

In some embodiments, at least a portion of the outer membrane 14 of the air supported structure may be contained or positioned at least partially within the at least one container 12 in the packaged state of the system 10. For example, in one embodiment the entirety of the outer membrane 14 may be contained within a container 12 in the packaged state. In the deployed state, the outer membrane 14 may be at least substantially removed from within the container 12. Similar to the outer membrane 14, at least a portion of the at least one air handling mechanism 16 may be contained or positioned at least partially within a container 12 in the packaged state. For example, in one embodiment the entirety of the at least one air handling mechanism 16 may be contained within a container 12 in the packaged state. The outer membrane 14 and the at least one air handling mechanism 16 may be contained within the same container 12 or different containers 12 in the packaged state. In the deployed state, the at least one air handling mechanism 16 may or may not be at least substantially removed from within its container 12.

As explained further below and shown in FIGS. 2-8, the outer membrane 14 may be configured to couple to a base in a substantially air-tight manner in the deployed state of the system 10, and the at least one air handling mechanism 16 may be configured to force air between the outer membrane 14 and the base to erect the air supported structure into the deployed state via internal air pressure. In this way, in the deployed state the at least one air handling mechanism 16 may force air between the outer membrane 14 and the base to form and maintain an enclosure therebetween via the internal air pressure, as shown in FIGS. 2-8. The outer membrane 14 and the at least one air handling mechanism 16 may be contained within the same container or differing containers 12 in the packaged state. As mentioned above and shown in FIGS. 2-8, at least one container 12 may form a portion of the base.

The at least one container 12 may be any transportable enclosure of any configuration that forms an accessible cavity. In some embodiments, the at least one container 12 may be configured such that it can be opened to allow contents to be loaded or installed therein, and closed or sealed such that the contents therein are substantially surrounded by the container 12 in the packaged state. Similarly, the at least one container 12 may configured such that it can be opened to provide access therein in the deployed state, such as when it is in communication (e.g., in selective communication via a door mechanism, airlock, or the like) with the enclosure. In such an embodiment, the at least one container 12 may thereby be utilized to provide ingress into and egress from the enclosure in the deployed state.

In some embodiments, the at least one container 12 may be sized and otherwise configured to be relatively transportable or portable such that the system 10 can be transported to any location in the packaged state. For example, in some embodiments the at least one container 12 may be configured such that it can be transported by traditional or conventional shipping or transportation channels and modes, such as being a standard or suitable cargo or shipping container, tractor-trailer container, rail container, etc. In some embodiments, the at least one container 12 may include an inner structural framework that forms at least the outer walls and/or roof or top of the at least one container 12. In some such embodiments, the structural framework may be covered or clad in a substantially stiff and/or strong corrugated or irregular covering or a planar covering (e.g., metal sheets). In some other such embodiments, the structural framework may be covered or clad in a light and flexible covering, such as a fabric material (e.g., a material substantially similar or the same as the outer membrane 14).

As shown in FIG. 1, in some embodiments of the system 10 that include a plurality of containers 12, the system 10 may include at least two containers 12 that are identical or at least substantially similar. However, in other embodiments of the system 10 that include a plurality of containers 12, at least two containers 12 may differ from each other. In some embodiments, the at least one container 12 may be elongate, such as having the general shape of a cuboid or rectangular parallelepiped as shown in FIG. 1. At least some of the exterior and/or interior sides or walls of the at least one container 12 may be planar or may be irregularly shaped, such as being corrugated as shown in FIG. 1.

In some embodiments, the at least one container 12 may include additional components or mechanisms at least in the packaged state beyond those that are necessary to erect the air supported structure, such as components or mechanisms in addition to the outer membrane 14 and the at least one air handling mechanism 16 that is configured to form the internal air pressure. For example, the at least one container 12 may include one or more inner liner in the packaged state that is coupled to, or is configured to couple to, the outer membrane 14. The at least one inner liner may extend along the interior of the outer membrane 14 in the deployed state such that at least one air pocket is formed between the at least one inner liner and the outer membrane 14 (and between adjacent inner liners if a plurality of liners are included).

As shown in FIGS. 2-8, in some embodiments, the system 10 may include an electrical power source 18 configured to provide electrical power to at least the air handling mechanism 16 (i.e., the air pressure creation mechanism). The electrical power source 18 may be contained within the at least one container 12 at least in the packaged state of the system 10. As shown in FIGS. 2-8, in some embodiments, at least a portion of the electrical power source 18 may be positioned exterior to the cavity of the at least one container 12 at least in the deployed state, such as being coupled to and/or extending from an exterior surface of the at least one container 12. The electrical power source 18 may be any electrical power source. For example, the electrical power source 18 may include at least one solar panel, generator (e.g., powered or driven by gasoline, propane or any other combustible material), wind turbine, water turbine, grid-based power input/connection, electrical power storage device (e.g., a battery) or any other electrical power providing mechanism/apparatus that is configured to generate/produce and/or provide electrical power to the air supported structure/components thereof. For example, in addition to providing power for the air handling mechanism 16, the at least one electrical power source 18 may provide electrical power for other systems of the air supported structure and/or for any use or purpose within or about the structure and enclosure.

As noted above, the air handling mechanism 16 may be configured as an air pressure creation mechanism that creates and/or maintains the internal air pressure within the enclosure of the air supported structure in the deployed or open state of the system 10. For example, the air handling mechanism 10 may include a blower, fan, turbine, pump or any other air movement or pressure creation mechanism that is configured to force air between the outer membrane 14 and the base in the deployed or open state of the system 10 to form and/or maintain the internal air pressure within the enclosure. For example, the air handling mechanism 10 may force air between the outer membrane 14 and the base when the outer membrane 14 is unpacked from the at least one container 12 and affixed to the base (such as the ground, a foundation and/or at least one container 12) to form the enclosure. In some embodiments, the air handling mechanism 16 may be configured to selectively introduce varying amounts of "new" air into the enclosure (i.e., non-recirculated air, such as air from the atmosphere about the air supported structure) that is necessary to maintain an internal air pressure (such as within an acceptable internal air pressure range) within the enclosure to account for air/pressure loss.

The air handling mechanism 16 may also be configured as an air treatment mechanism that selectively heats, cools and/or treats the air or atmosphere within the enclosure. For example, the air handling mechanism 16 may include an air heating mechanism configured to provide relatively warm air into the enclosure, an air conditioning mechanism configured to provide relatively cool (and potentially dry) air into the enclosure, and/or and air treatment mechanism configured to clean, condition, treat or otherwise improve the quality of the air within the enclosure to suit a particular need and/or desire. For example, an air treatment mechanism may clean air that is passed into the enclosure by the air handling mechanism 16 to remove one or more pollutants or substances from the air. As another example, an air treatment mechanism may add one or more substances to air that is passed into the enclosure (e.g., carbon dioxide, nitrogen, oxygen, etc.) by the air handling mechanism, such as to facilitate or enhance a particular use of the enclosure (e.g., agricultural, medicinal/therapeutic, etc.).

The air handling mechanism 16 may heat, cool and/or treat the air of the enclosure by heating, cooling and/or treating the air that the air handling mechanism 16 forces into the enclosure to create and/or maintain the internal air pressure within the enclosure of the air supported structure 10 in the deployed or open state of the system 10. In some such embodiments, the air handling mechanism 16 may be configured to recirculate air within the enclosure and supplement it with any additional air necessary to maintain the internal air pressure, and such recirculating and/or supplemental air may be selectively heated, cooled and/or treated by the air handling mechanism 16. The air heating mechanism, air conditioning mechanism and/or air treatment mechanism of the air handling mechanism 16 may be contained with the same container 12 as each other (at least in the packaged state), such as the same container 12 as other components of the air handling mechanism 16.

Figure 8:
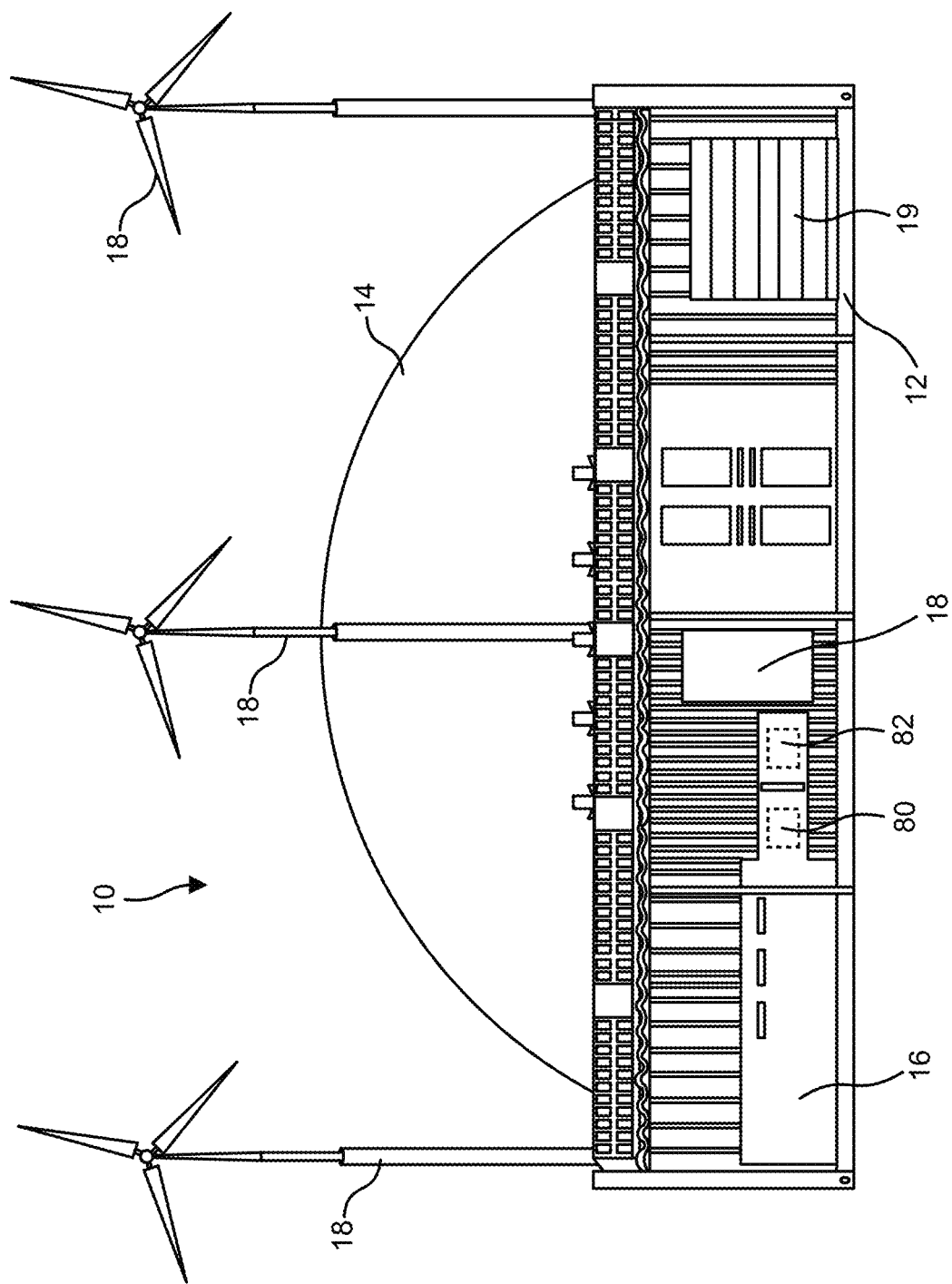
FIG. 8 is a right end view of the air supported structure system of FIG. 2.

As shown in FIG. 8, the air handling mechanism 16 may thereby form or include a supply flow 80 of air extending into the enclosure (from exterior thereto), which may form and/or maintain the internal air pressure and/or condition (e.g., heat, cool, humidify, de-humidify, etc.) the atmosphere within the enclosure. Further, as also shown in FIG. 8, the air handling mechanism 16 may thereby also form or include a return flow 82 of air extending from the enclosure (from within the enclosure), which may be utilized to form and/or maintain the internal air pressure (potentially with additional air) and/or condition (e.g., heat, cool, humidify, de-humidify, etc.) the atmosphere within the enclosure. As noted above, at least a portion of the return flow 82 of air may be re-utilized as at least a portion of the supply flow 80.

When an air supported structure is needed at a desired location, the system 10 may be transported to the location in the packed state (i.e., the at least one container 12 and its contents may be transported to the location), as shown in FIG. 1. Once the system 10 is positioned at, or proximate to, a desired location, the system 10 may be relatively rapidly deployed or erected into the unpacked or deployed state, as shown in FIGS. 2-8. For example, the at least one container 12 may be at least partially opened and the outer membrane 14 (and potentially at least one liner coupled thereto) stored therein in the packaged state may be at least substantially removed from the at least one container 12. A portion of the outer membrane 14 and/or the air handling mechanism 16 may or may not remain within the at least one container 12 in the deployed state.

The outer membrane 14 may be formed from any sheet-like flexible and strong material. In some embodiments, the outer membrane 14 may be formed of a fabric, a rubberized fabric, a fabric coated with plastic, or any suitable combination thereof. In some embodiments, the outer membrane 14 may include one or more coatings. The outer membrane 14 may be transparent, translucent or opaque. In some embodiments, the outer membrane 14 may be formed from a plurality of panels, with adjacent panels being coupled to each other via at least one substantially airtight seam, seal or joint. The outer membrane 14 may be any size and shape which may depend, at least in part, upon the desired size and shape of the resulting air supported structure. For example, the outer membrane 14 may be elongate with a longer width or lateral direction than length or longitudinal direction, as shown in FIGS. 2-8. However, the outer membrane 14 may be any shape or configuration, such as square, round, oval or any other shape.

The unpacked outer membrane 14 may be attached to a base, such as the ground, a foundation structure and/or the at least one container 12 in a substantially airtight manner. As noted above, one or more containers 12 of the system 10 may be utilized as a portion of the base. In such an embodiment, the outer membrane 14 may be attached to the at least one container 12 in a substantially airtight manner (if not previously affixed thereto). The outer membrane 14 may be attached indirectly and/or directly to the exterior and/or interior of the at least one container 12 in a substantially airtight manner. The outer membrane 14 may be attached to the base in a substantially airtight manner such that the air handling mechanism 16 can force air therebetween to create an internal air pressure that is greater than the air pressure of the atmosphere exterior to or about the outer membrane 14. In this way, the outer membrane 14 (and any inner liners or hardware attached thereto) may be elevated or lifted (and maintained is such a position) above the base via the internal air pressure to form the enclosure/air supported structure.

The outer membrane 14 may couple to the ground and/or a foundation structure in a substantially airtight manner in addition to, or instead of, coupling to at least one container 12. For example, as shown in FIGS. 2-8, at least a first portion of the outer membrane 14 may couple to at least one container 12 substantially airtight manner, and a second portion of the outer membrane 14 may couple to the ground and/or a foundation structure in a substantially airtight manner. In other embodiments, the outer membrane 14 may couple to the ground and/or a foundation structure in a substantially airtight manner and indirectly couple to the at least one container 12 or not couple to the at least one container 12. For example, the outer membrane 14 may couple to the ground and/or a foundation structure in a substantially airtight manner, and directly couple to an intermediate structure that is coupled to at least one container 12 (e.g., in a substantially airtight manner). The outer membrane 14 may couple (directly or indirectly) to a container 12 that contained the outer membrane 14 in the packaged state and/or a container 12 that did not contain the outer membrane 14 in the packaged state. In some embodiments, a combination of at least one container 12 and the outer membrane 14 may form the enclosure (or at least part of the enclosure), as shown in FIGS. 5-8. As shown in FIGS. 2-8, in some embodiments a plurality of containers 12 may form a portion of the base (and/or the enclosure), such as a pair of containers 12 at opposing ends of the enclosure. As noted above, the outer membrane 14 may be attached or coupled to at least one container 12 in any substantially airtight manner. For example, the outer membrane 14 may be directly and/or indirectly attached or coupled to an exterior surface of the at least one container 12 in a substantially airtight manner. The at least one container 12 may also be securely coupled to the ground and/or a foundation. In some embodiments, the at least one container 12 may be coupled to the ground via a plurality of earth anchors that penetrate into the ground and resist being pulled out therefrom.

In another example, the outer membrane 14 may be directly and/or indirectly attached or coupled to an interior surface of the at least one container 12 in a substantially airtight manner. In yet another example, the outer membrane 14 may be attached or coupled in a substantially airtight manner to a member, mechanism or portion that extends or protrudes from an interior and/or exterior surface of the at least one container 12 (which may itself be attached or coupled to the surface(s) in a substantially airtight manner).

The outer membrane 14 may couple to the base in any substantially airtight manner. For example, the outer membrane 14, the base and/or coupling mechanism that couples the outer membrane 14 to the base may be of any configuration or arrangement that couples the outer membrane 14 and the base together via a substantially airtight seal or joint. In some embodiments, the outer membrane 14 may mechanically couple to the base via one or more attachment or anchoring mechanisms, and sealingly couple to the base in a substantially airtight manner via a separate connection or connection mechanism. For example, in some such embodiments the system 10 may include a skirt portion (not shown) that extends from the inner surface of the outer membrane 14 and forms a substantially airtight seal with the base. In some embodiments, the outer membrane 14 may be sealingly coupled to the via the internal air pressure (e.g., by acting to seal a skirt to the base) and/or anchor mechanisms that physically couple the outer membrane 14 to the base (e.g., earth anchors, liquid (e.g., water) filled tubes or bags, sand or aggregate filled tubes or bags, etc.) and resists the upward forces applied by the internal air pressure. In this way, the anchoring mechanisms may provide a mechanical attachment between the outer membrane 14 and the base to carry the loads of the outer membrane 14 (which may not be substantially airtight), and the skirt portion may be coupled to the base to provide a substantially airtight seal between the outer membrane 14 and the base. However, as noted above, any other arrangement or configuration may be utilized to couple the outer membrane 14 and the base (e.g., the ground, a foundation structure extending from the ground and/or at least one container 12) in a substantially airtight manner such that the internal air pressure can be created therebetween via the air handling mechanism 16 to form the enclosure/structure.

At least one container 12 may be utilized as, or provide for, ingress into the enclosure and egress out of the enclosure in the deployed state. For example, as shown in FIGS. 2-8, at least one container 12 may include at least one passageway 19 that is in selective communication with the enclosure to provide for ingress and egress. In some embodiments, the passageway 19 may be configured such that the air pressure within the enclosure is at least substantially maintained (e.g., because air pressure loss is substantially prevented by the passageway 19 or limited by the passageway 19 such that the air handling mechanism 16 is able to appropriately compensate for such loss). For example, in some such embodiments the at least one passageway 19 may be configured as an airlock. The at least one passageway 19 of the at least one container 12 may be any size or shape to allow users and/or objects to enter and exit the enclosure. In some embodiments, in addition to, or instead of, the passageway 19 provided by the at least one container 12, the air supported structure may include at least one passageway 19 in communication with the enclosure that is not in communication with the at least one container 12.

The passageway 19 provided by the at least one container 12 may be in direct selective communication or indirect selective communication with the enclosure. For example, in some embodiments an intermediate portion or structure may extend between the outer membrane 14 and the at least one container 12 (e.g., an air lock) such that the passageway 19 of the at least one container 12 is in direct communication with the intermediate portion (i.e., is not directly coupled or in direct communication with the enclosure), but provides for ingress and egress to the enclosure via the intermediate portion. As another example, the outer membrane 14 may extend from the at least one container 12 such that the at least one passageway 19 of the at least one container 12 is in direct selective communication with the enclosure.

Since the outer membrane 14 and the air handling mechanism 16 of the system 10 (and potentially a power source 18) are contained within the at least one container 12 in the packed or closed state, the air supported structure system 10 may be rapidly activated or deployed from the packed or closed state into the open or deployed state. The system 10 may thereby be a transportable, self-contained air supported structure system 10 that forms and maintains an air supported structure (that forms an enclosure). Further, as the at least one container 12 may form at least one or more passageway 19 into the enclosure, the enclosure can be utilized as soon as the air supported structure is formed via the internal air pressure. In use, the outer membrane 14 may be unpacked from the at least one container 12 in the packaged state, and coupled (if not already coupled) to the base in a substantially airtight manner (such as the ground, a foundation and/or the at least one container 12), and the air handling mechanism 16 may force air therebetween to create and maintain the internal air pressure to establish and maintain the enclosure. As discussed above, the potential uses or purposes of the enclosure/air supported structure are limitless. The at least one container 12, the outer membrane 14 and/or the interior/enclosure of the system 10 may be configured and/or arranged to suit any use or need—such as any portable and rapidly deployable shelter, storage structure, entertainment structure, agricultural structure, medical facility, military facility, etc.

FIGS. 9-12 illustrate exemplary configurations and methods of coupling the outer membrane 14 to the at least one container 12 of the system 10 in a substantially airtight manner. As shown in FIGS. 9-12, the outer membrane 14 to may be coupled to the and outer side or wall 24 of the at least one container 12 in a substantially airtight manner via a support frame 26. The frame 26 may be configured to couple to at least one outer side surface portion 24 of the at least one container 12 in a substantially airtight manner. In some embodiments, the outer side surface 24 of the at least one container may be irregular or non-planar, as shown in FIGS. 9-12. In some other embodiments, the outer side surface 24 of the at least one container may be substantially flat or planar. The support frame 26 may be structural in that it may support the loads of the outer membrane 14 or otherwise transfer them to the container 12 (and, ultimately, to a support base). In some embodiments, the system 10 may include support or frame members positioned interior of the at least one container 12 (not shown) to couple the support frame 26 to the at least one container 12 and/or provide structural support to the support frame 26. The support frame 26 may be coupled directly or indirectly to at least one outer surface or side 24 of the at least one container 12 via any mechanism, configuration or method that is sufficiently strong to prevent the support frame 26 from becoming detached therefrom at least due to the internal pressure within the enclosure.

Figure 9:
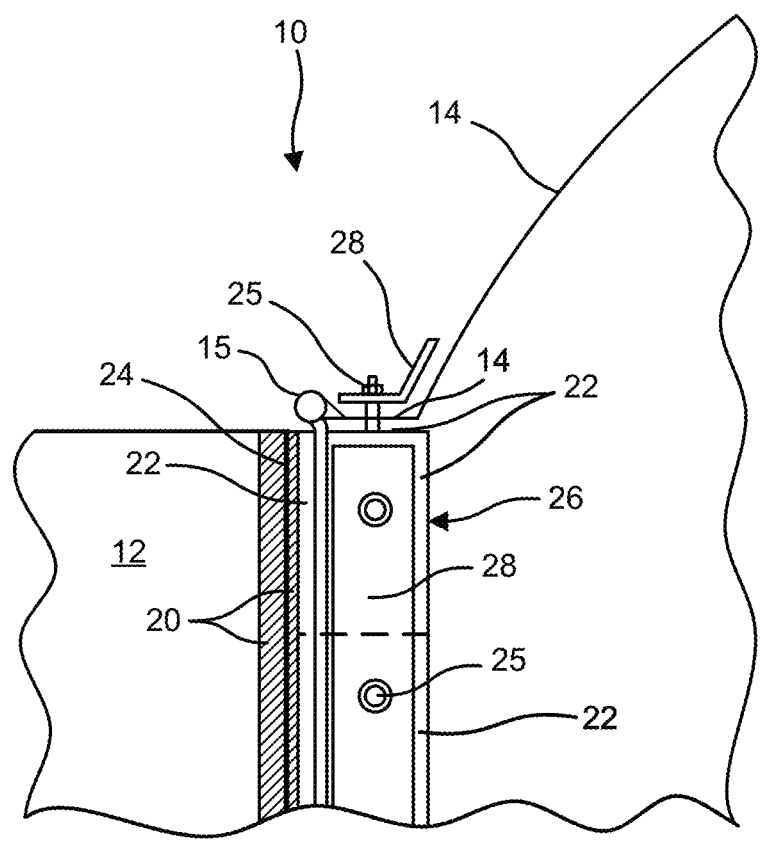
FIG. 9 is a cross-sectional side view of an exemplary connection between a container and the outer membrane of the air supported structure system of FIG. 2.
Figure 10:
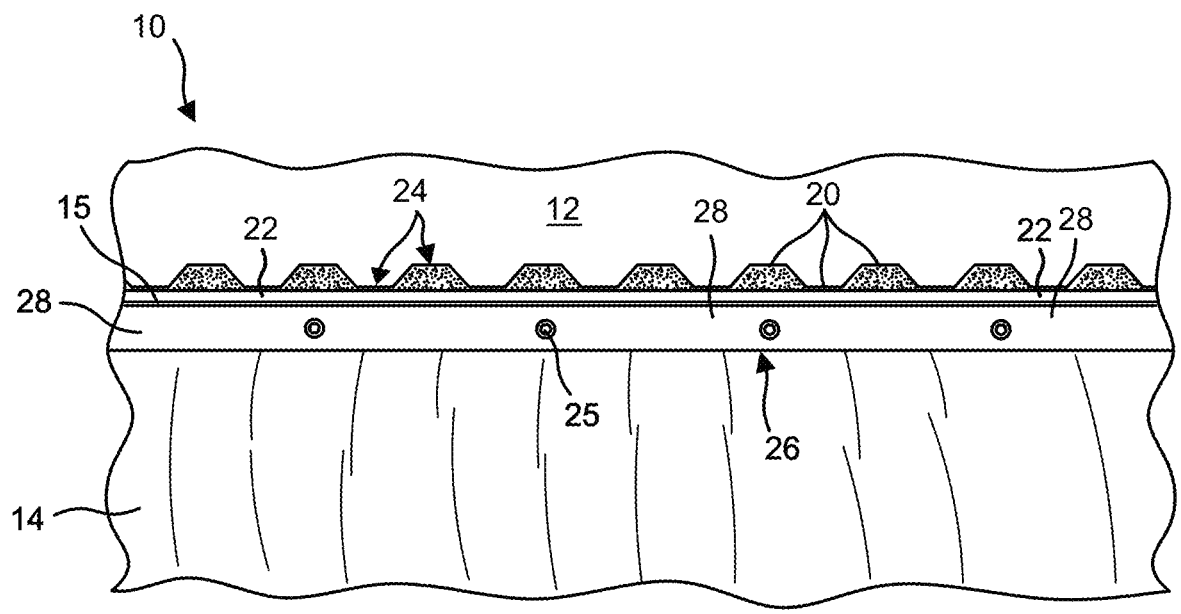
FIG. 10 is a cross-sectional top view of the exemplary connection between the container and outer membrane of FIG. 9.

In some embodiments, the support frame 26 may include at least one spacer portion 20 that mirrors the shape of a corresponding portion of the outer surface 24 of the at least one container 12, as shown in FIGS. 9 and 10. The at least one spacer portion 20 may act form a substantially linear or planar attachment surface, or otherwise extend between the support frame 26 (e.g., a backside thereof) and the outer side surface portion 24 of the at least one container 12 to form a substantially airtight seal therebetween. The at least one spacer portion 20 may comprise a structural portion (e.g., a metal portion) and/or a non-structural portion (a portion formed of foam, rubber, plastic, etc.). The at least one spacer portion 20 may be comprised of any component(s) that effectively bridge the outer side surface 24 of the at least one container 12 (whether planar or irregular) and the frame 26 to form a substantially air-tight junction therebetween. In this way, the at least one spacer portion 20 may fill-in any space or gap between the support frame 26 and the outer side wall or surface 24 of the at least one container 12.

Figure 11:
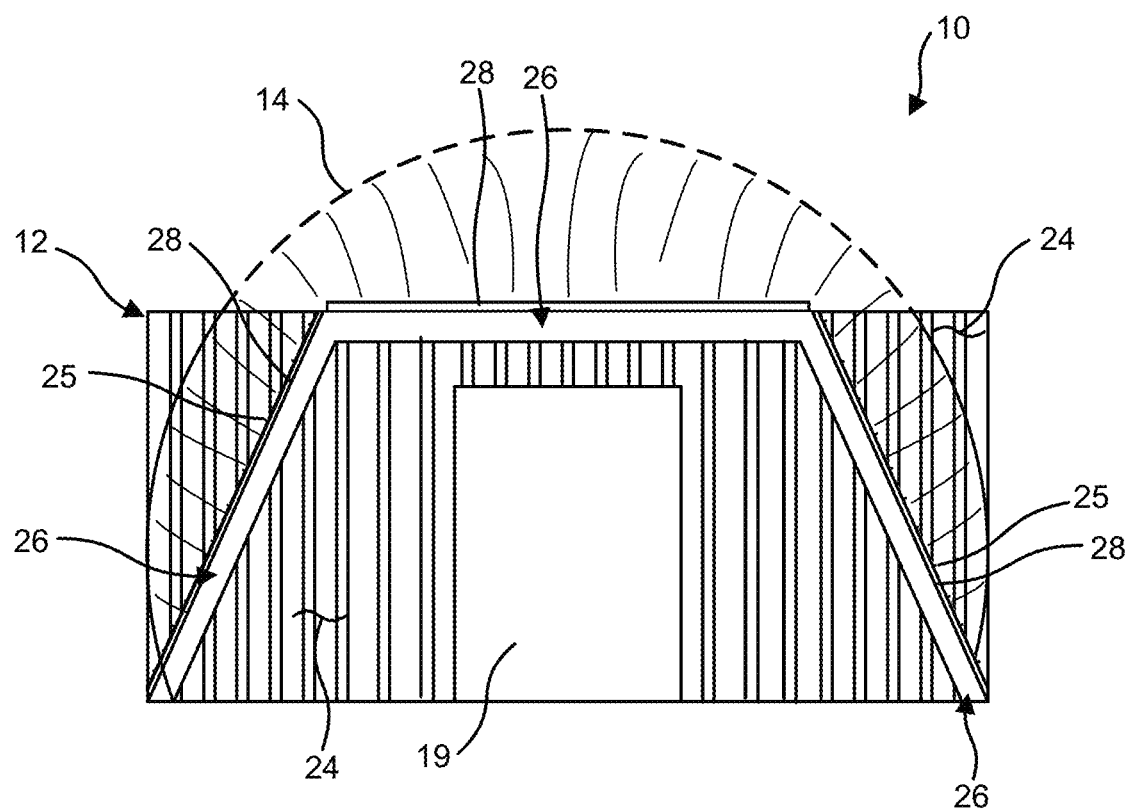
FIG. 11 is a cross-sectional end view of an exemplary air supported structure system utilizing the connection between the container and outer membrane of FIG. 9.

As also shown in FIGS. 9-12, the support frame 26 may include a mounting surface or edge 22 that is formed by, or is coupled to, the support frame 26. The mounting surface 22 of the support frame 26 may be configured to couple with a portion of the outer membrane 14 in a substantially airtight manner. The mounting surface 22 of the support frame 26 may be any outer face or edge, such as a face or edge oriented parallel or angled (e.g., perpendicular) to the outer wall surface 24 of the at least one container 12. In some embodiments, the mounting surface or edge 22 and/or the clamping member 28 may include one or more regular, flat and/or straight portions, as shown in FIGS. 9-11. In some embodiments, the mounting surface or edge 22 and/or the clamping member 28 may include at least one arcuate or non-linear portion. In some embodiments, the mounting surface 22 may be a substantially planar outer surface of the support frame 26.

As shown in FIGS. 9-12, an end portion of the outer membrane 14 may be clamped to the mounting surface or edge 22 in a substantially airtight manner via mounting studs 25 extending from the mounting surface 22 of the support frame 26 and a clamping member 28 that clamps to the mounting surface 22 of the support frame 26 via the mounting studs 25. As shown in FIG. 9, the mounting surface 22 be a top outer surface of the support frame 26, and the mounting studs 25 may extend substantially vertically therefrom. The mounting studs 25 may extend through the end portion of the outer membrane 14 (e.g., via pre-defined apertures or aperture created by the mounting studs 25) and through a clamping member 28, and be utilized to exert a compressive or clamping force to the outer membrane 14 between the clamping member 28 and the mounting surface 22 of the support frame 26, as shown in FIG. 9. For example, the mounting studs 25 may be externally threaded, and internally threaded nuts, washers and the like may be utilized to couple to the mounting studs 25 and force the clamping member 28 toward the mounting surface 22 of the support frame 26 to trap (and apply a compressive force) to the outer membrane 14 therebetween, as shown in FIG. 9. It is noted that any compressive mechanism may be utilized with the mounting studs 25 to compress the clamping member 28 toward or against the mounting surface 22 of the support frame 26 to compress and trap the outer membrane 14 therebetween.

The clamping member 28 may be substantially, stiff or otherwise configured to prevent the formation of a gap or space between the outer membrane 14 and the mounting surface 22 of the support frame 26, and thereby allow the internal pressure within the enclosure to escape. For example, the clamping member 28 may be configured to prevent bending or other deformation away from the mounting surface 22 of the support frame 26 (e.g., between the mounting studs 25), such as via the forces acting of the outer membrane 12 acting to "pull" the outer membrane 12 off or away from the mounting surface 22. In some embodiments, the clamping member 28 may be formed of metal (e.g., plate steel) or any other structural material.

Figure 12:
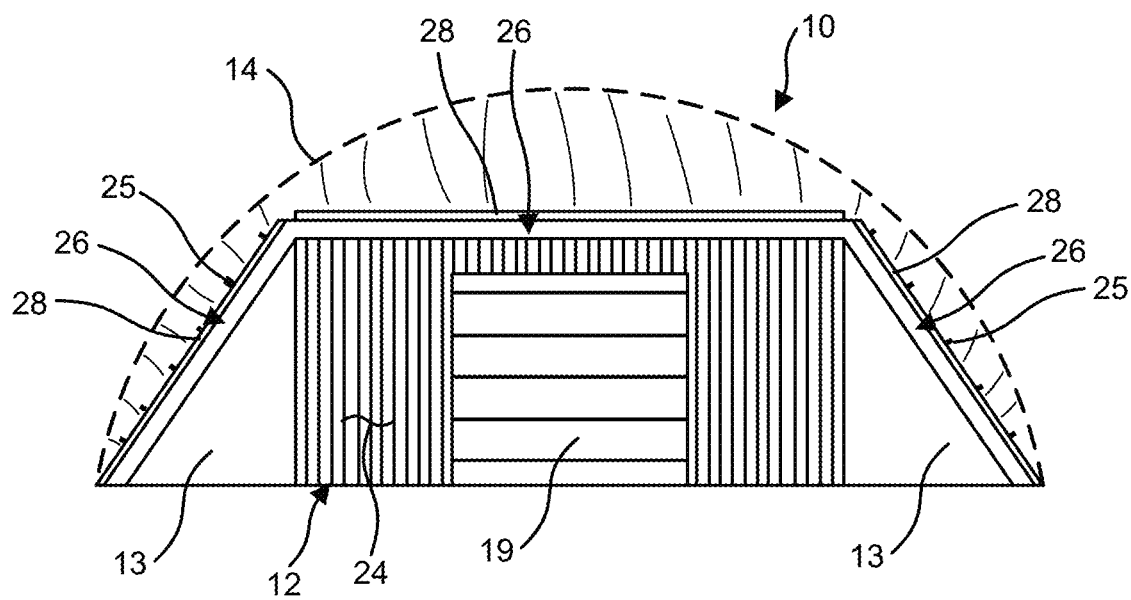
FIG. 12 is a cross-sectional end view of another exemplary air supported structure system utilizing the connection between the container and outer membrane of FIG. 9.

As shown in FIGS. 9, 11 and 12, at least a portion of the clamping member 28 may be an angled or non-flat/non-planar member. For example, the clamping member 28 may include a first flat or planar portion that extends along, and is clamped to, the mounting surface 22 of the support frame 26, as shown in FIG. 9. The first portion of the angled clamping member 28 may thereby clamp the end portion of the outer membrane 14 to the mounting surface 22 of the support frame 26 (i.e., the end portion of the outer membrane 14 may be compressed between the first portion of the angled clamping member 28 and the mounting surface 22 of the support frame 26). A second flat or planar portion of the clamping member 28 may extend from the first portion at an angle (i.e., at an angle greater than 0 degrees or less than 180 degrees), as shown in FIG. 9. The second portion of the clamping member 28 may be configured to extend upwardly from the mounting surface 22 of the support frame 26 and potentially along the outer surface of the outer membrane 14. In some embodiments, a portion of the mounting surface 22 of the support frame 26 may include such an angled clamping member 28 to clamp a corresponding portion of the outer membrane 14 thereto, while at least one other portion of the mounting surface 22 of the support frame 26 may include differently configured clamping member 28 (e.g., a flat, planar or plate clamping member 28) to clamp a corresponding portion of the outer membrane 14 thereto. For example, a top portion of the support frame 26 may include an angled clamp member 28, and leg portions of the support frame 26 may include a flat or planar clamp member 28, as explained further below.

As shown in FIG. 9, the outer membrane 14 may include an expanded edge, end or periphery portion 15 that aids in preventing the outer membrane 14 from slipping or otherwise translating from between the mounting surface 22 of the support frame 26 and the clamping member. As shown in FIG. 9, the expanded edge 15 of the outer membrane 14 may be positioned past the clamping member 28 on an opposing side thereof as the enclosure. The expanded edge 15 of the outer membrane 14 may provide or form a thicker portion of the outer membrane 14 as compared to the portion of the outer membrane 14 clamped between the clamping member 28 and the mounting surface 22. The expanded edge 15 of the outer membrane 14 may thereby require the formation of a fairly significant gap between the clamping member 28 and the mounting surface 22 for the outer membrane 14 to "pull out" or otherwise slip between the clamping member 28 and the mounting surface 22. In one exemplary embodiment, the expanded edge portion 15 of the outer membrane 14 may be a rope edge portion formed by the end portion of the outer membrane 14 extending about/over a rope, cord or other elongate member and being fixed to itself.

As shown in FIGS. 11 and 12, the support frame 26 may extend along a portion of the outer wall or side surface 24 of at least one container 12 so that the outer wall or side surface 24 of the at least one container 12 forms a portion of the enclosure of the air supported structure. As also shown in FIGS. 11 and 12 and discussed above, the outer wall or side surface 24 of the at least one container 12 may include at least one passageway 19 for ingress and egress with the enclosure of the air supported structure (formed by internal air pressure, the outer membrane 14 and at least one portion of the at least one container 12). The support frame 26 may extend over the outer side wall 24 of the container 12 about or around the at least one passageway 19 so as do not interfere with use of the at least one passageway 19 (if provided). For example, as shown in FIGS. 9 and 11, the support frame 26 may include a header portion that extends over the at least one passageway 19 and/or adjacent or proximate to (and potentially parallel with) the top surface or edge (e.g., roof) of the container 12. In some embodiments, the mounting surface 22 of the support frame 26 may extend substantially even or aligned (and potentially parallel) with the top surface or edge (e.g., roof) of the container 12, as shown in FIGS. 9 and 11.

As shown in FIG. 11, in some embodiments the support frame 26 may include a pair leg or upright portions positioned on opposing sides of the at least one passageway 19 that extend to the top portion of the support frame 26. The leg or upright portions may extend substantially vertically, or be angled as they extend from the ground or base to the top portion of the support frame 26 as shown in FIGS. 10 and 11. In some embodiments, the leg portions of the support frame 26 may extend from the ground or other base surface or structure. In some embodiments, the leg portions of the support frame 26 may extend from the bottom or underside of the at least one container. As shown in FIG. 10, in some embodiments the entirety of the leg portions of the support frame 26 may extend along or over the exterior side surface 24.

However, as shown in FIG. 11, in some embodiments at least a portion of at least one of the leg portions of the support frame 26 may extend past the exterior side surface 24. For example, as shown in FIG. 11, in some embodiments the entirety (or a least the substantially majority) of the leg portions of the support frame 26 may extend past the exterior side surface 24 (but to the top portion of the support frame 26). In such embodiments, the support frame 26 may include wing wall portions 13 that extend between the leg portions of the support frame 26, an outer surface of the at least one container 12 and the base surface (i.e., the ground or a base structure or foundation built on the ground). In some embodiments, the wing wall portions 13 may extend between the leg portions of the support frame 26 and the outer side wall 24 that the top portion of the support frame is coupled to. In this way, the support frame 26 may extend linearly or straight and form a planar engagement surface with the outer side wall 24 of the container 12, as shown in FIGS. 9-12. In other embodiments, the wing wall portions 13 may extend between the leg portions of the support frame 26 and a side wall of the at least one container 12 that differs from the side wall 24 that the top portion of the support frame 26 is coupled to.

The wing wall portions 13 may form a substantially airtight wall portion between the leg portions of the support frame 26, an outer surface (e.g., the outer side wall 24) of the at least one container 12 and the base surface. The wing wall portions 13 may also thereby form a portion of the enclosure, as shown in FIG. 11. The wing wall portions 13 may be formed of any material(s) and any configuration that is effective in extending between the leg portions of the support frame 26, an outer surface of the at least one container 12 and the base surface is a substantially airtight manner. In some embodiments, the wing wall portions 13 may include or be formed of the same or substantially similar material as that of the outer membrane 14.

However, the system 10 may include any number and/or configuration of support frames 26 for coupling to any number and/or configuration of exterior surface portions 24 of the at least one container 12 in a substantially airtight manner. The size and/or shape of the support frame 26 may vary and may be related at least upon the configuration of the exterior surface 24 of the at least one container 12. Further, the size and/or shape of the at least one spacer portion 20 of the support frame 26 may vary and may be related at least upon the configuration of the exterior surface 24 of the at least one container 12 and the configuration, shape and/or size of the outer membrane 14, for example. In some embodiments, the at least one spacer portion 20 may not be needed or included. Further, the size and/or shape of the mounting surface or edge 22 of the support frame 26 may vary, and may be related at least upon the configuration, shape and/or size of the portion the outer membrane 14 configured to couple thereto, for example. In this way, the system 10 may include at least one support frame 26 that is configured to couple to the exterior surface 24 of at least one container 12 in a substantially airtight manner, and provide at least one mounting surface or edge 22 configured to couple to a corresponding portion of the outer membrane 14 in a substantially airtight manner, such as via a clamping member 28. The at least one support frame 26 may be configured to extend between the exterior surface 24 of at least one container 12 and the outer membrane 14 to form a substantially airtight connection.

FIGS. 13-16 illustrate other exemplary configurations, structures, arrangements and methods of coupling an outer membrane to at least one container of a portable and rapidly deployable air supported structure system 110 according to the present disclosure. The exemplary system 110 of FIGS. 13-16 is substantially similar to the exemplary system 10 of FIGS. 1-12, and therefore like reference numerals preceded by the numeral "1" are used to indicate like elements, aspects, functions, configurations and the like. Exemplary system 110 may include any of the elements, aspects, functions, configurations and the like of exemplary system 10. The description above with respect to the exemplary system 10 thereby equally applies to the exemplary system 110 of FIGS. 13-16, including description regarding alternative embodiments thereto (i.e., modifications, variations or the like). The exemplary portable system 110 of FIG. 13-16 differs from the exemplary system 10 of with respect to the attachment of the outer membrane 224 to the at least one container 212, such as the configuration and/or construction of the mounting surface 122 of the support frame 126.

Figure 13:
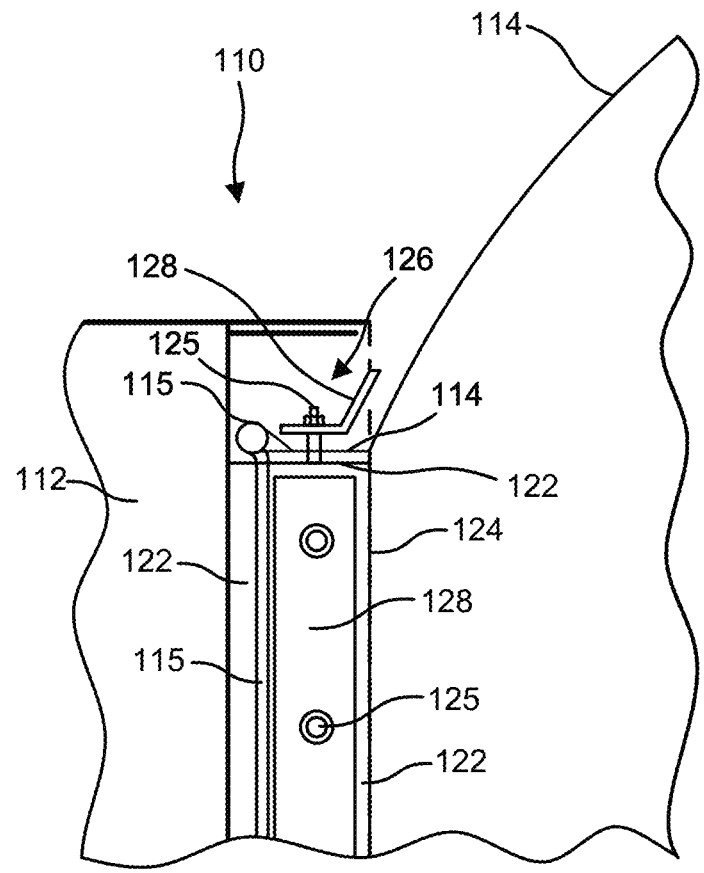
FIG. 13 is a cross-sectional side view of an exemplary connection between a container and the outer membrane of an air supported structure system according to the present disclosure.
Figure 14:
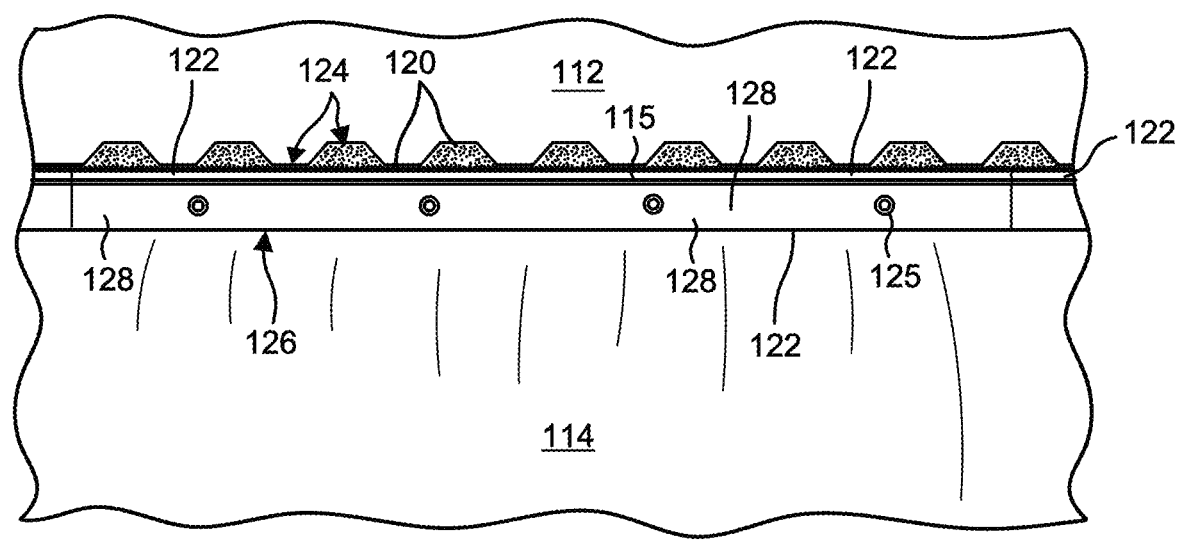
FIG. 14 is a cross-sectional top view of the exemplary connection between the container and outer membrane of FIG. 13.
Figure 15:
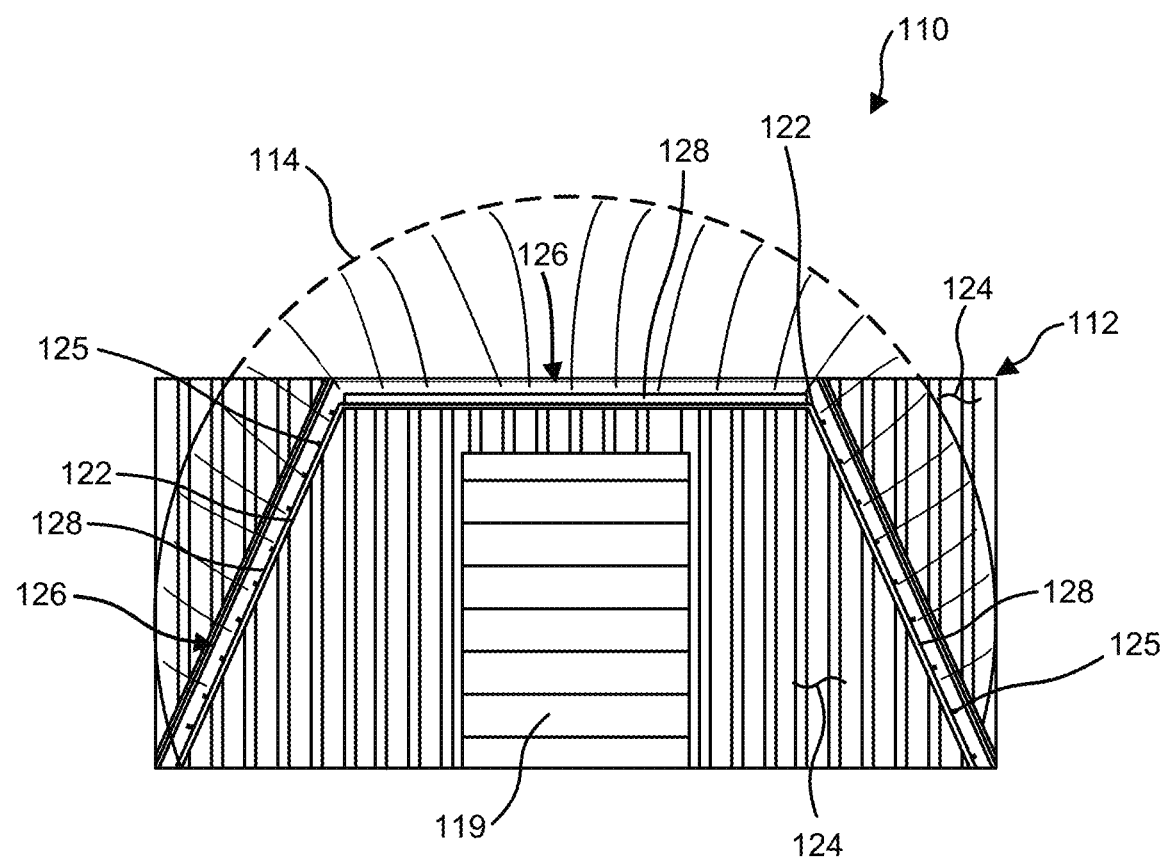
FIG. 15 is a cross-sectional end view of an exemplary air supported structure system utilizing the connection between the container and outer membrane of FIG. 13.
Figure 16:
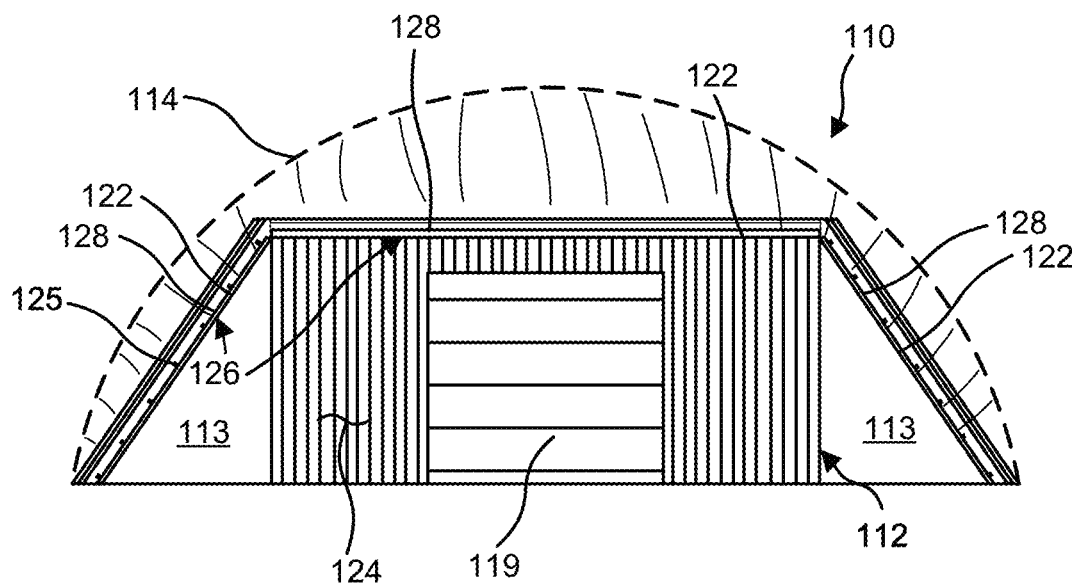
FIG. 16 is a cross-sectional end view of another exemplary air supported structure system utilizing the connection between the container and outer membrane of FIG. 13

As shown in FIGS. 14-16, the support frame 126 of the system 110 is formed in part by a recess, channel or passageway that extends into the outer side surface 124 of the at least one container 112. The lower or bottom surface of the support recess 126 thereby forms the mounting surface 122, as shown in FIG. 13. The support recess 126 may be formed by a recess in the outer side wall 126 and/or a structural support frame extending within the at least one container 112.

The support recess 126 may be configured such that the thickness or height of the opening at the outer side surface 124 provide sufficient clearance for the outer membrane 114 to extend through (and potentially for manual assembly of the outer membrane 114, clamping members 128 and attachment hardware). However, in some embodiments the opening of the recess 126 formed between the outer membrane 114 and the outer side surface 124 of the container 112 may be covered or blocked after assembly, such as via a flap or skirt of material (e.g., a material the same or sustainably similar to the outer membrane 114) or filler member (not shown)

As shown in FIG. 15, the support recess 126 may extend similarly to the top portion and leg portions of the support frame 26 of FIGS. 9-12 described above. Specifically, a top portion of the support recess 126 may extend along the outer side surface 124 proximate (and potentially parallel) to the top edge of the container 112 and over the passageway 116. Further, a pair of leg or upright portions of the support recess 126 may be positioned on opposing sides of the at least one passageway 119 and extend to the top portion of the support recess 126. The leg or upright portions of the support recess 126 may extend substantially vertically, or be angled as they extend from the bottom of the side surface 124 to the top portion of the support recess 126 as shown in FIG. 15. As another example, as shown in FIG. 16, the support recess 126 may only include the top portion thereof, and side wing walls 113 extending from lateral ends of the support recess 126 and/or the exterior side 124 of the container 112. The side wing walls 113 may be configures substantially similarly to the side wing walls 13 of the support frame 26 of FIGS. 9-12 described above. As another example, the side wing walls 113 of the system 110 may include or form a support recess that is continuous with the support recess 126 in the outer side wall 124.

FIGS. 17-20 illustrate other exemplary configurations, structures, arrangements and methods of coupling an outer membrane to at least one container of a portable and rapidly deployable air supported structure system 210 according to the present disclosure. The exemplary system 210 of FIGS. 17-20 is substantially similar to the exemplary system 10 of FIGS. 1-12 and exemplary system 110 of FIGS. 13-16, and therefore like reference numerals preceded by the numeral "2" are used to indicate like elements, aspects, functions, configurations and the like. Exemplary system 210 may include any of the elements, aspects, functions, configurations and the like of exemplary system 10 and/or 110. The description above with respect to the exemplary systems 10 and 110 thereby equally applies to the exemplary system 210 of FIGS. 17-20, including description regarding alternative embodiments thereto (i.e., modifications, variations or the like). The exemplary portable system 210 of FIGS. 17-20 differs from the exemplary systems 10 and 110 with respect to the attachment of the outer membrane 224 to the at least one container 212.

Figure 17:
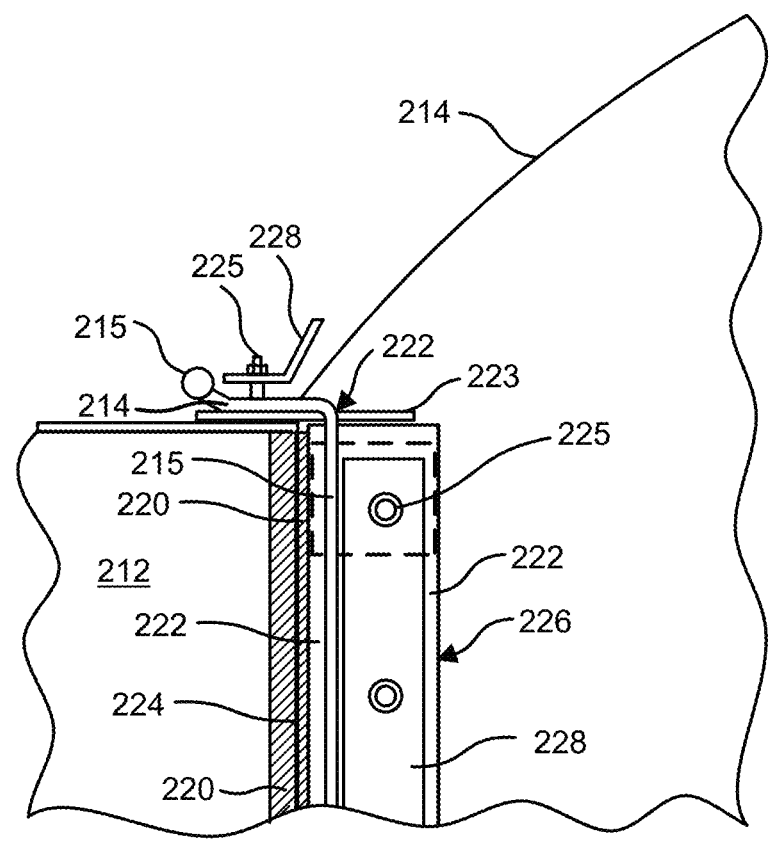
FIG. 17 is a cross-sectional side view of an exemplary connection between a container and the outer membrane of an air supported structure system according to the present disclosure.
Figure 18:
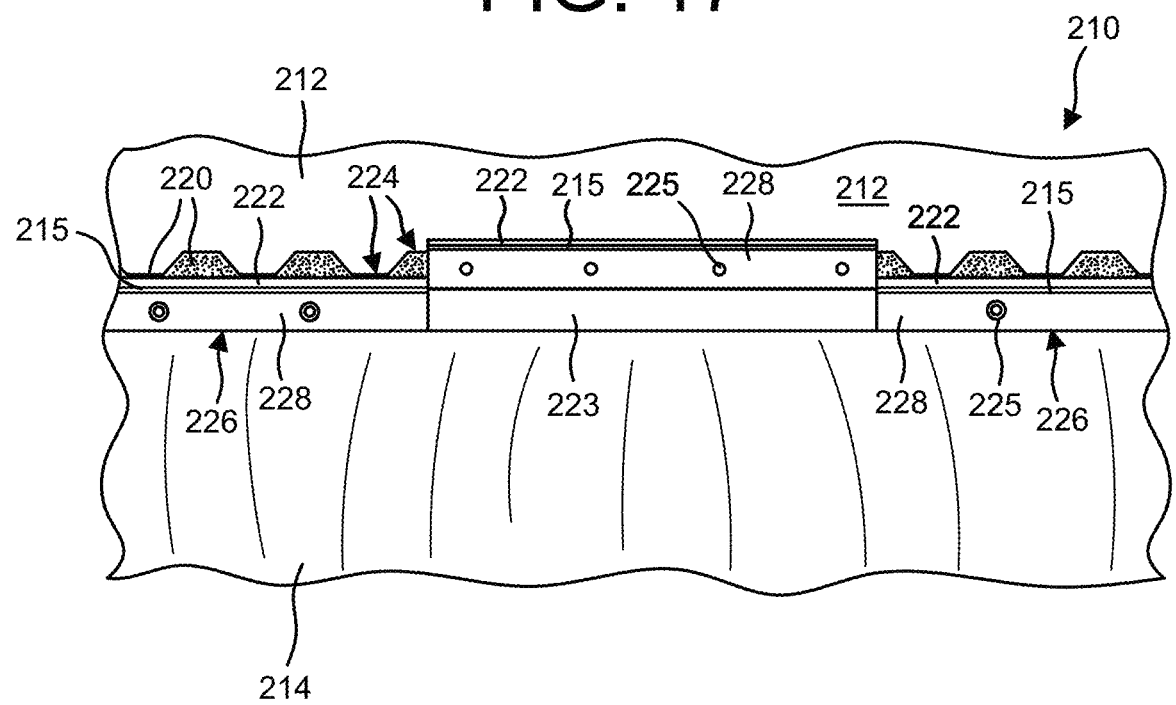
FIG. 18 is a cross-sectional top view of the exemplary connection between the container and outer membrane of FIG. 17.

As shown in FIGS. 17-20, the attachment of the outer membrane 224 to the at least one container 212 of the system 210 is substantially similar to that of the system 10 shown in FIGS. 9-12 and described above. As shown in FIGS. 17 and 18, the system 210 differs from the system 10 in the attachment of the outer membrane 214 to the top side or surface of the at least one container 212. Rather than attachment to the top portion of the support frame 226, the system 210 includes a coupling plate 223 that is attached to, and spans over, the top portion of the support frame 226 and the top side of the at least one container 212, as shown in FIGS. 17 and 18. The coupling plate 223 may thereby assist in coupling the top and side leg portions of the support frame 226 to the outer side 224 of the container.

Figure 19:
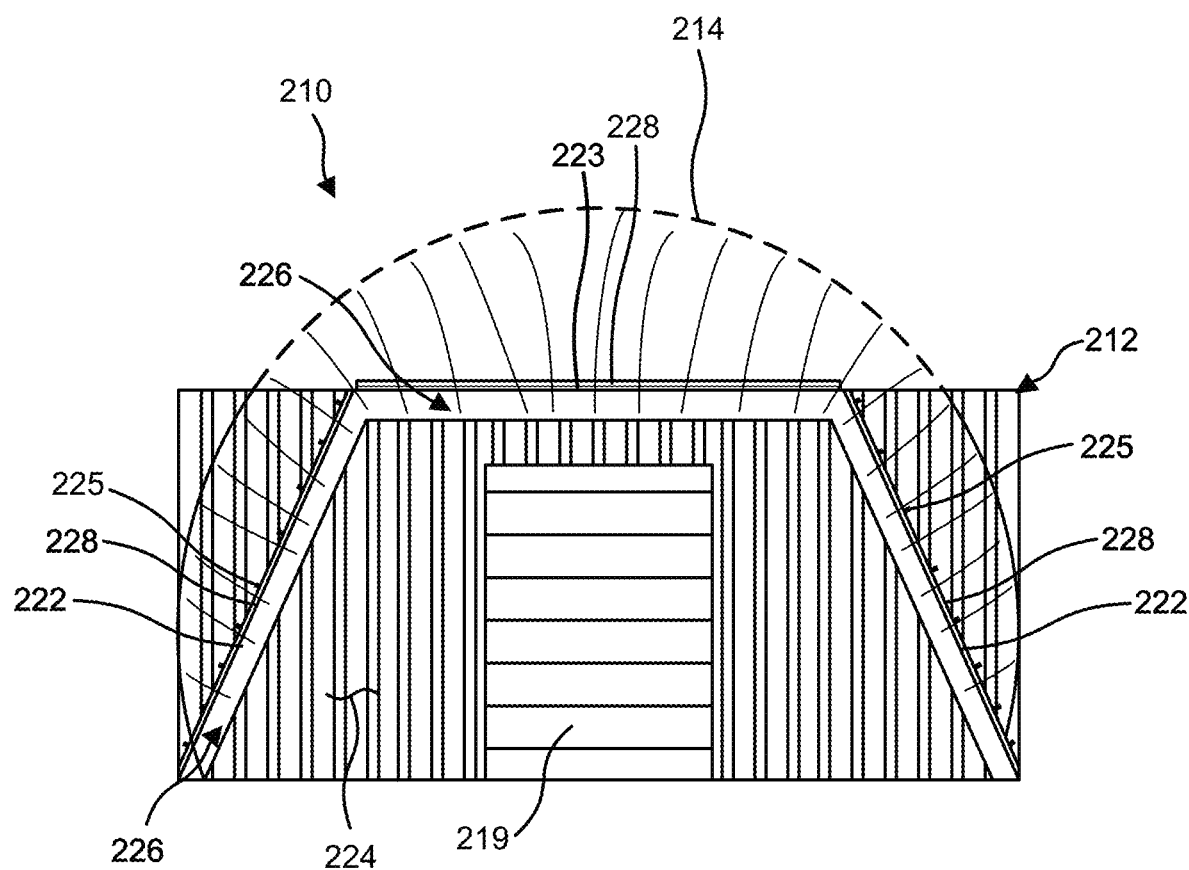
FIG. 19 is a cross-sectional end view of an exemplary air supported structure system utilizing the connection between the container and outer membrane of FIG. 17.
Figure 20:
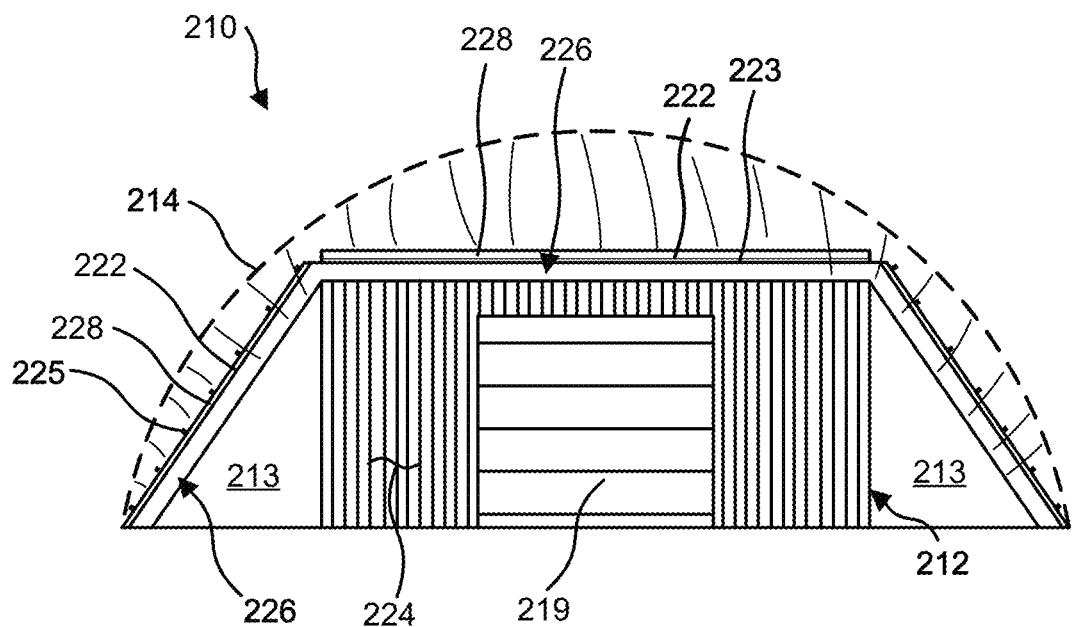
FIG. 20 is a cross-sectional end view of another exemplary air supported structure system utilizing the connection between the container and outer membrane of FIG. 17.

As shown in FIGS. 17 and 18, the coupling plate 223 defines the mounting surface 222 through which the top portion of the outer membrane 214 attaches to the container 212. In some embodiments, the mounting surface 222 is defined by the portion of the coupling plate 223 extending over the top side of the container 212 and includes the mounting studs 225, and is thereby coupled with the outer membrane 214 via the clamping member 228, as shown in FIGS. 17 and 18. The top portion of the end of the outer member 214 may thereby attach over the top side of the container 212 (between the mounting surface 222 of the coupling plate 223 and the clamping member 228), and to the mounting surface 222 of the leg portions of the support frame 226, as shown in FIGS. 17 and 18. The leg portions of the support frame 226 may be coupled to the outer side wall 224 of the at least one container 214 as shown in FIG. 19, and/or the leg portions of the support frame 226 may be portions of support wings 213 and extend to an outer side of the container 212 as shown in FIG. 20. As noted above, the system 210 may include a framework positioned interior of the enclosure to provide structural support to the support frame 226, support wings 213 and/or the coupling plate 223.

Figure 21:
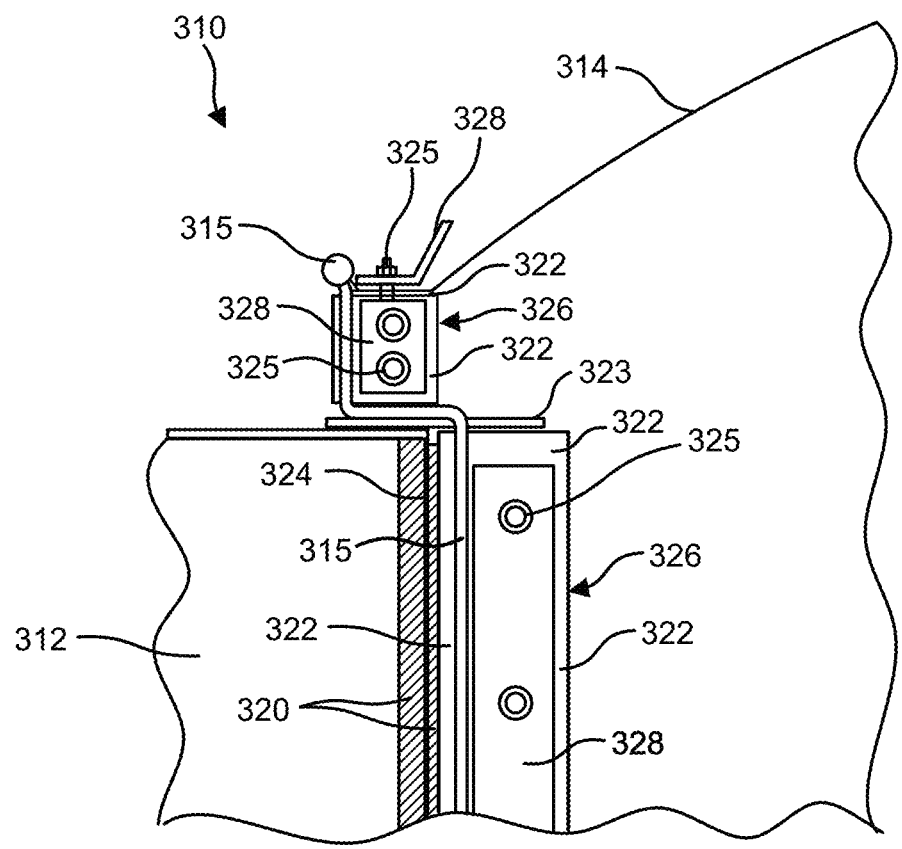
FIG. 21 is a cross-sectional side view of an exemplary connection between a container and the outer membrane of an air supported structure system according to the present disclosure.
Figure 22:
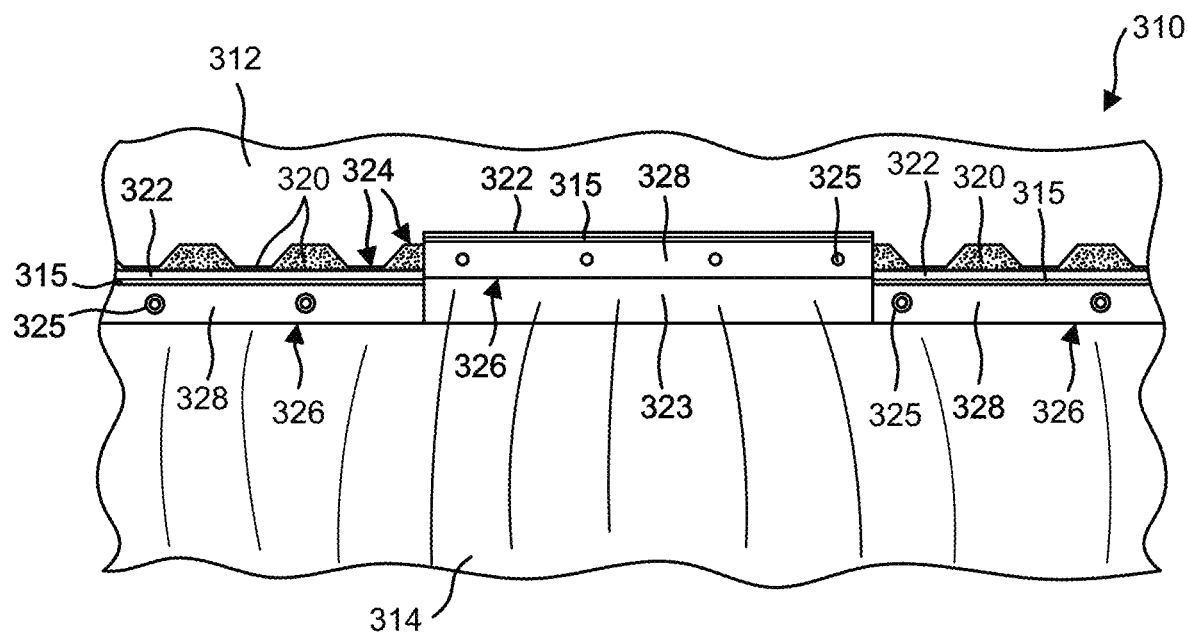
FIG. 22 is a cross-sectional top view of the exemplary connection between the container and outer membrane of FIG. 21.
Figure 23:
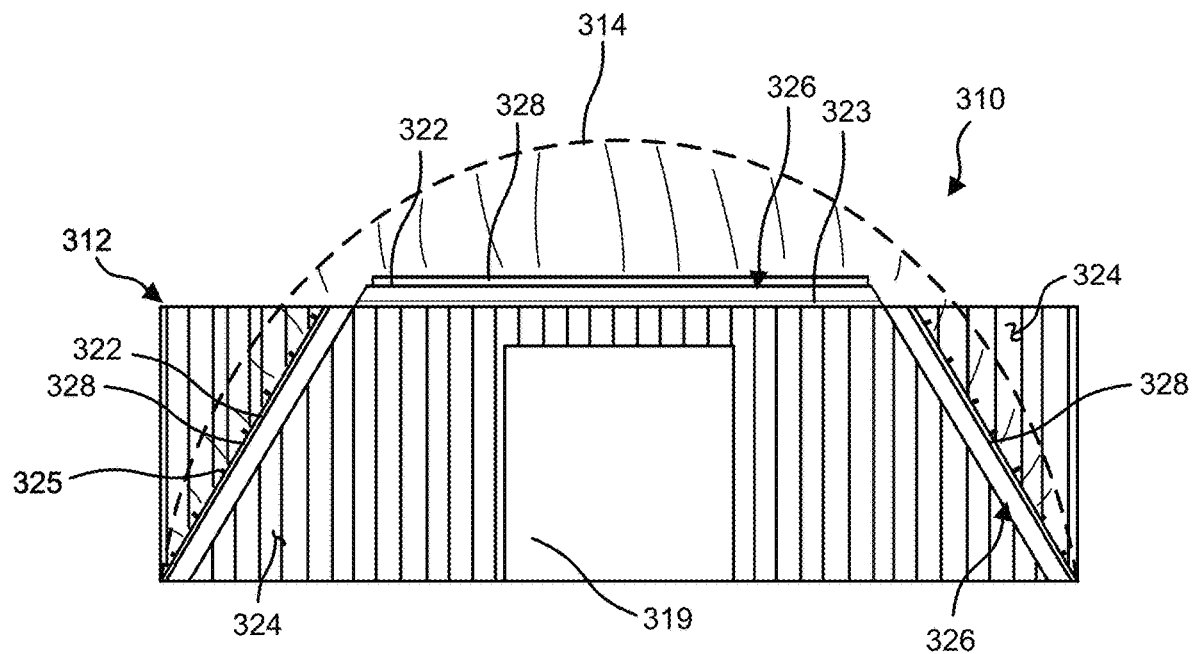
FIG. 23 is a cross-sectional end view of an exemplary air supported structure system utilizing the connection between the container and outer membrane of FIG. 21.

FIGS. 21-23 illustrate other exemplary configurations, structures, arrangements and methods of coupling an outer membrane to at least one container of a portable and rapidly deployable air supported structure system 310 according to the present disclosure. The exemplary system 310 of FIGS. 21-23 is substantially similar to the exemplary system 10 of FIGS. 1-12, the exemplary system 110 of FIGS. 13-16 and the exemplary system 210 of FIGS. 17-20, and therefore like reference numerals preceded by the numeral "3" are used to indicate like elements, aspects, functions, configurations and the like. Exemplary system 310 may include any of the elements, aspects, functions, configurations and the like of exemplary system 10, 110 and/or 210. The description above with respect to the exemplary systems 10, 110 and 210 thereby equally applies to the exemplary system 310 of FIGS. 21-23, including description regarding alternative embodiments thereto (i.e., modifications, variations or the like). The exemplary portable system 310 of FIGS. 21-23 differs from the exemplary systems 10, 110 and 210 with respect to the attachment of the outer membrane 314 to the at least one container 312.

As shown in FIGS. 21-23, the attachment of the outer membrane 324 to the at least one container 312 of the system 310 is substantially similar to that of the system 210 shown in FIGS. 17-20 and described above. As shown in FIGS. 21-23, the system 310 differs from the system 210 in the attachment of the outer membrane 314 to the top side or surface of the at least one container 312. As opposed to attaching the top portion of the support frame 326 to the outer side wall 324, and attaching the outer membrane 314 to the portion of the coupling plate 323 above the top side of the container 312 (see FIGS. 17-20), the top portion of the support frame 326 is positioned on the coupling plate 323 above the top side of the container 312 and the outer membrane 314 is coupled to the mounting surface 322 of the top portion of the support frame 326. The medial portion of the coupling plate 323 that extends past the outer side wall 324 of the at least one container 312 (and potentially over the passageway 319) is thereby void of the support frame 326 and the outer membrane.

In some embodiments, the lateral end portions of the coupling plate 323 may be coupled to the leg portions of the support frame 326, as shown in FIGS. 21-23. The leg portions of the support frame 326 may be coupled to the outer side wall 324 of the at least one container 314 as shown in FIG. 23, and/or the leg portions of the support frame 326 may be portions of support wings that extend to the outer side wall 324 of the container 312 (see, for example, FIG. 20). The outer lateral ends of the top portion of the support frame 326 may be angled downwardly to the of the coupling plate 323 and further define the mounting surface 322, such as to provide a relatively smooth transition the of the outer membrane 314 to the leg portions. Similarly, the upper ends of the leg portions of the support frame 326 may extend parallel to the coupling plate 323 and be coupled to, or abut, the outer lateral ends of the coupling plate 323. For example, as shown in FIG. 23, the upper ends of the leg portions of the support frame 326 may be coupled to the underside of the outer lateral ends of the coupling plate 323 (e.g., on a side or surface that opposes the mounting surface 322 thereof). The mounting surface 322 of the leg portions and top portion of the support frame 326 (and potentially the coupling plate 323) may thereby form a continuous surface for the attachment of the outer membrane 314 thereto via the mounting studs 325 and clamping members 328.

Figure 24:
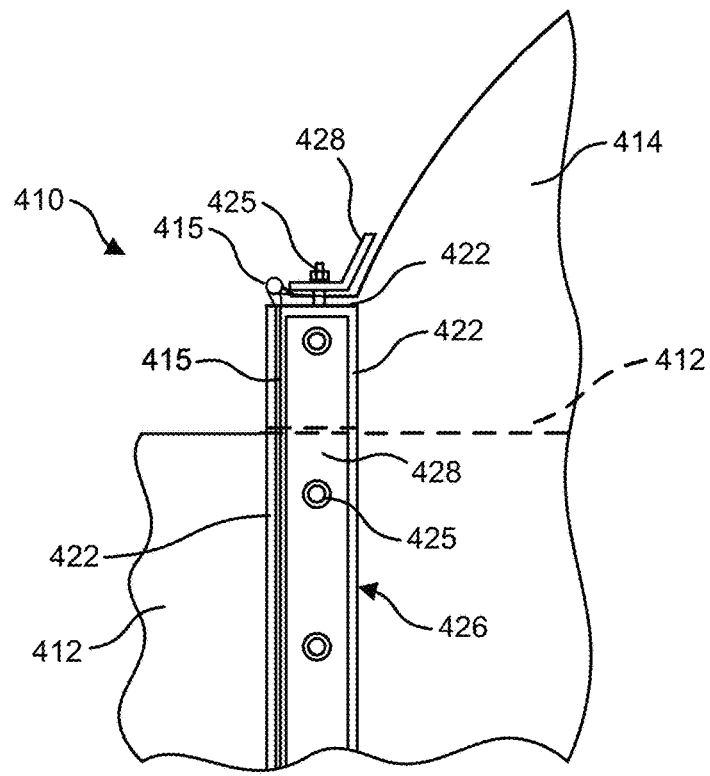
FIG. 24 is a cross-sectional side view of an exemplary connection between a container and the outer membrane of an air supported structure system according to the present disclosure.
Figure 25:
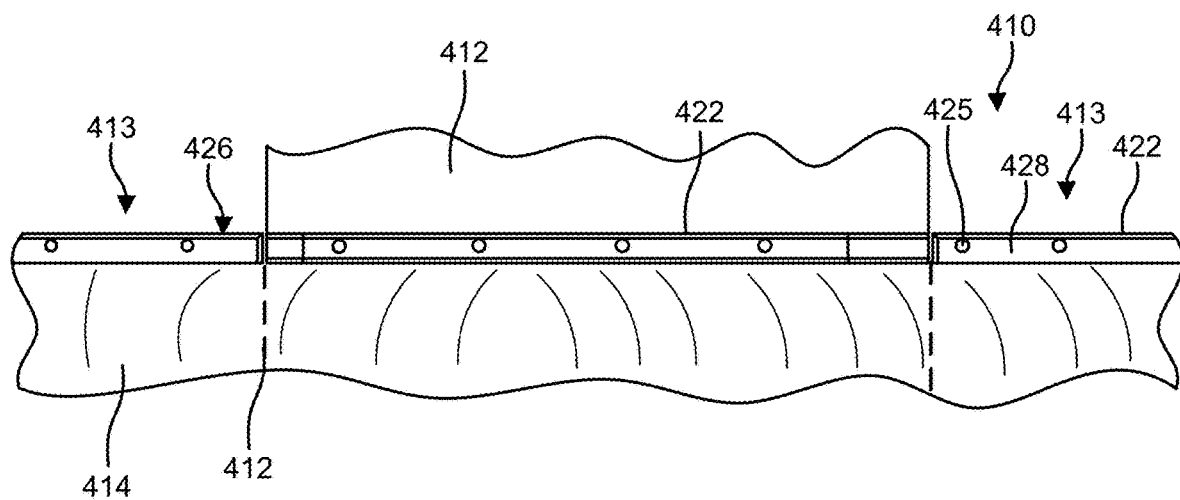
FIG. 25 is a cross-sectional top view of the exemplary connection between the container and outer membrane of FIG. 24.
Figure 26:
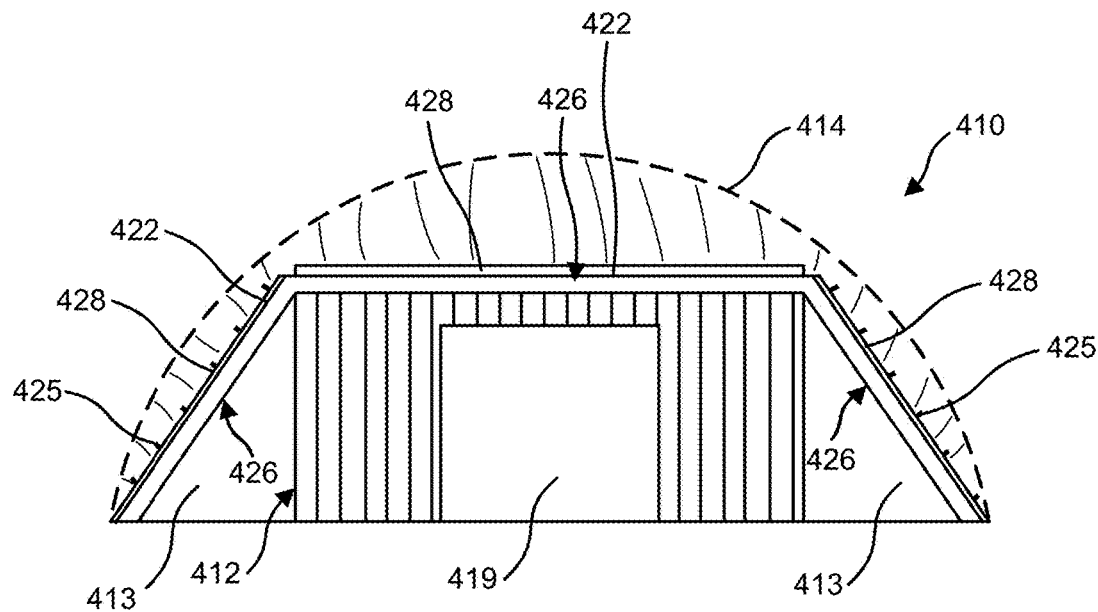
FIG. 26 is a cross-sectional end view of an exemplary air supported structure system utilizing the connection between the container and outer membrane of FIG. 2.

FIGS. 24-26 illustrate other exemplary configurations, structures, arrangements and methods of coupling an outer membrane to at least one container of a portable and rapidly deployable air supported structure system 410 according to the present disclosure. The exemplary system 410 of FIGS. 24-26 is substantially similar to the exemplary system 10 of FIGS. 1-12, the exemplary system 110 of FIGS. 13-16, the exemplary system 210 of FIGS. 17-20 and the exemplary system 310 of FIGS. 21-23, and therefore like reference numerals preceded by the numeral "4" are used to indicate like elements, aspects, functions, configurations and the like. Exemplary system 410 may include any of the elements, aspects, functions, configurations and the like of exemplary system 10, 110, 210 and/or 310. The description above with respect to the exemplary systems 10, 110, 210 and 310 thereby equally applies to the exemplary system 410 of FIGS. 24-26, including description regarding alternative embodiments thereto (i.e., modifications, variations or the like). The exemplary portable system 410 of FIGS. 24-26 differs from the exemplary systems 10, 110, 210 and 310 with respect to the attachment of the outer membrane 424 to the at least one container 412.

As shown in FIGS. 24-26, the top portion of the support frame 426 is positioned on, and coupled to, the top side or surface of the at least one container 412. As also shown in FIGS. 24-26, the leg portions of the support frame 426 are aligned with the top portion of the support frame 426 on wing wall potions 413 such that the frame 426 extends substantially linearly or straight across or over the at least one container 412. The support frame 426 (i.e., the top and leg portions of the support frame 426) may thereby positioned anywhere along the at least one container 412. For example, in some embodiments the support frame 426 may be substantially aligned with an outer side wall of the at least one container 412. In other embodiments, as shown in FIGS. 24 and 25, the support frame 426 may extend over or across a medial portion of the at least one container 412 (i.e., spaced from an outer side wall) (or aligned with a distal side wall) such that at least a portion of the at least one container 412 extends into the enclosure.

Figure 27:
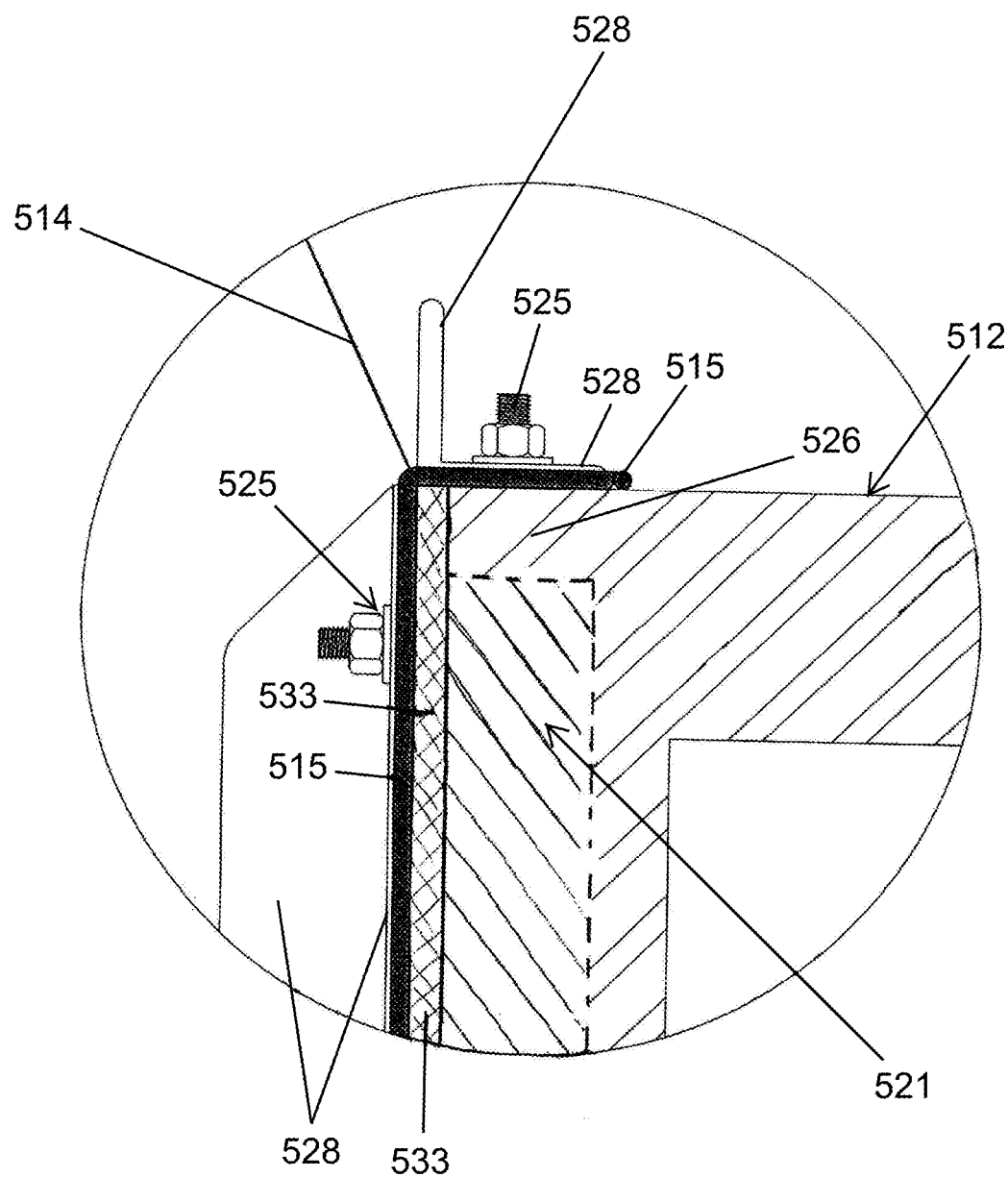
FIG. 27 is a cross-sectional side view of an exemplary connection between a container and the outer membrane of an air supported structure system according to the present disclosure.
Figure 28:
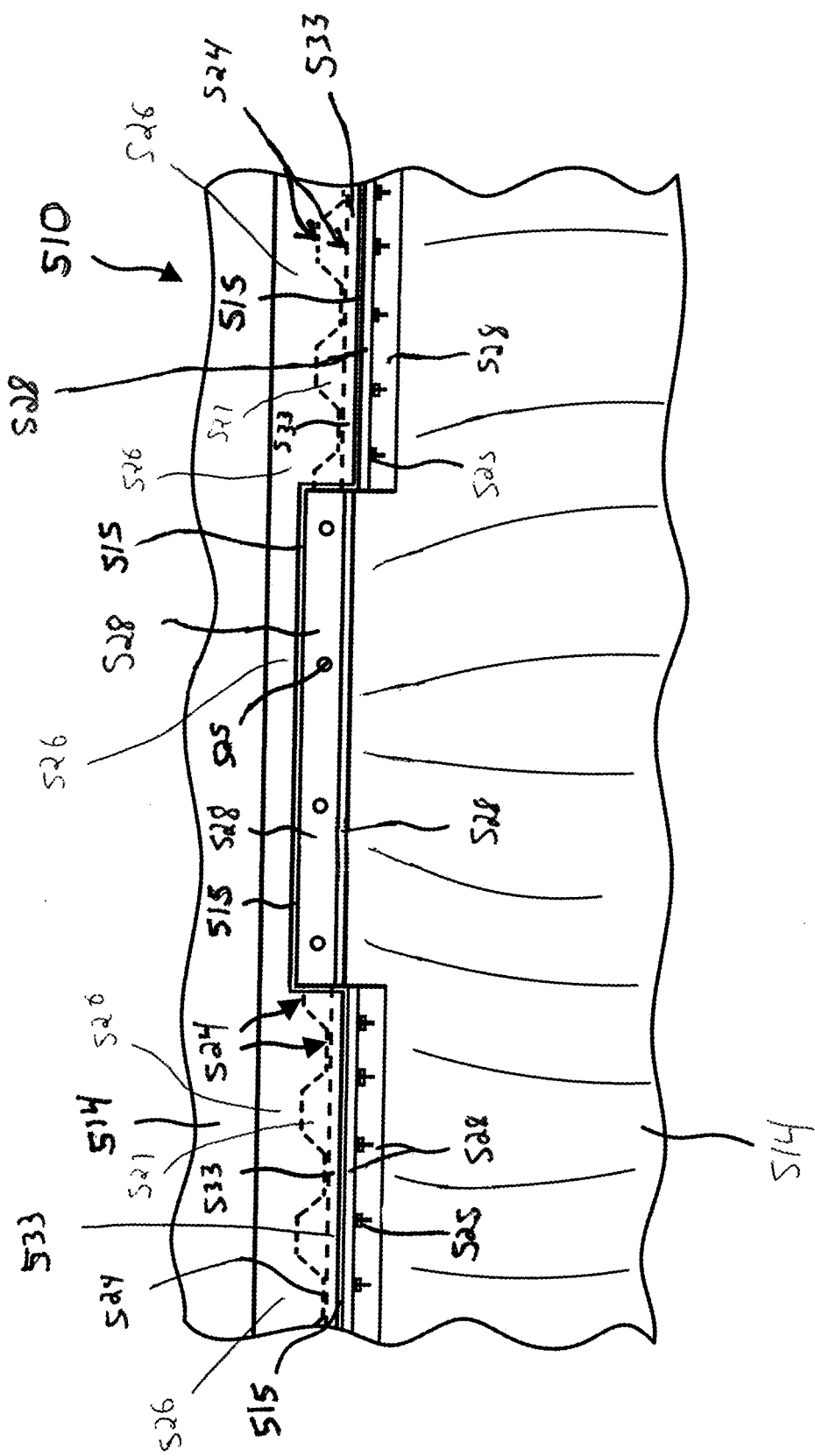
FIG. 28 is a cross-sectional top view of the exemplary connection between the container and outer membrane of FIG. 27.
Figure 29:
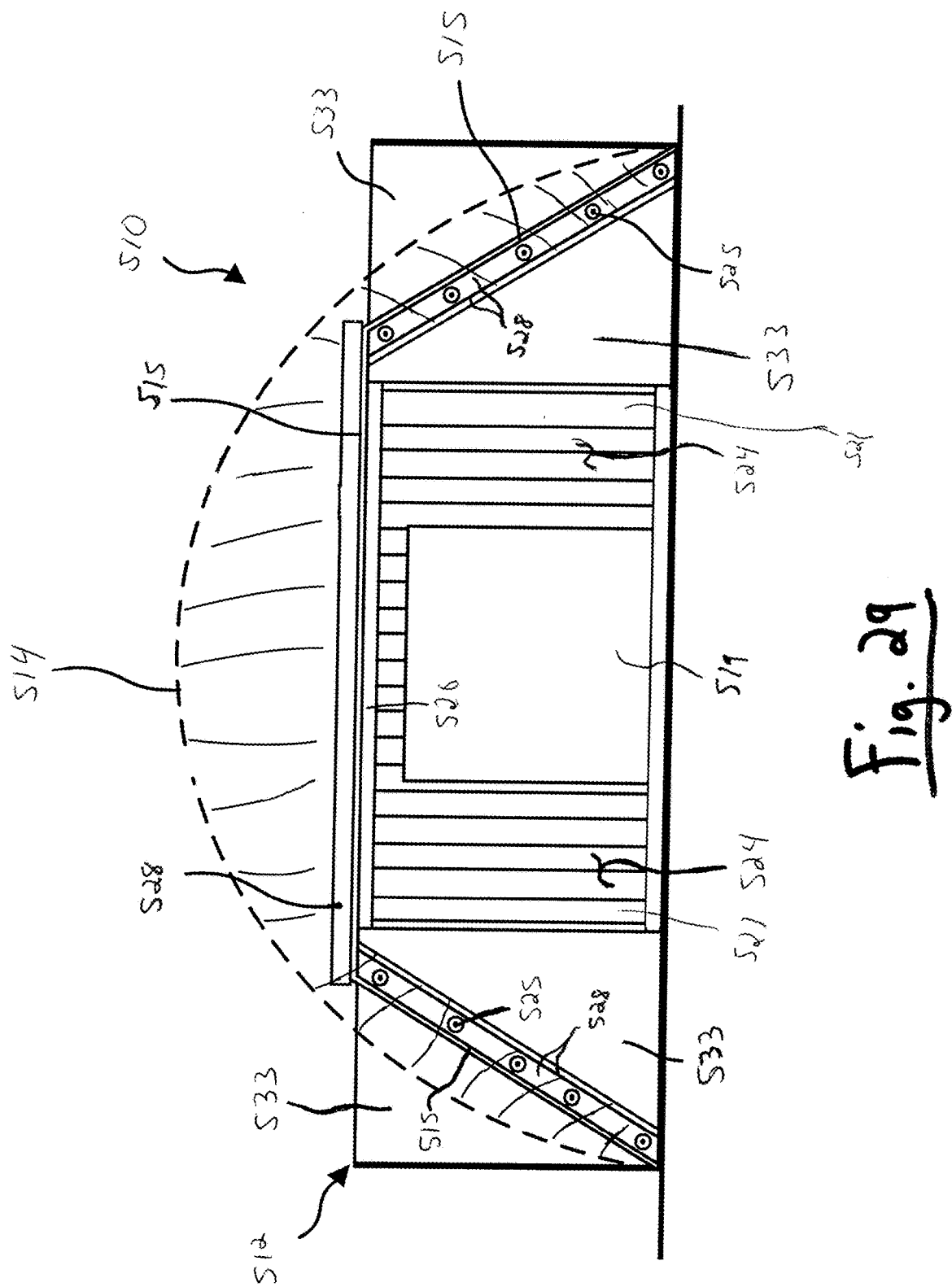
FIG. 29 is a cross-sectional end view of an exemplary air supported structure system utilizing the connection between the container and outer membrane of FIG. 27.

FIGS. 27-29 illustrate other exemplary configurations, structures, arrangements and methods of coupling an outer membrane to at least one container of a portable and rapidly deployable air supported structure system 510 according to the present disclosure. The exemplary system 510 of FIGS. 27-29 is substantially similar to the exemplary system 10 of FIGS. 1-12, the exemplary system 110 of FIGS. 13-16, the exemplary system 210 of FIGS. 17-20, the exemplary system 310 of FIGS. 21-23 and the exemplary system 410 of FIGS. 24-26, and therefore like reference numerals preceded by the numeral "5" are used to indicate like elements, aspects, functions, configurations and the like. Exemplary system 510 may include any of the elements, aspects, functions, configurations and the like of exemplary system 10, 110, 210, 310 and/or 410. The description above with respect to the exemplary systems 10, 110, 210, 310 and 410 thereby equally applies to the exemplary system 510 of FIGS. 27-29, including description regarding alternative embodiments thereto (i.e., modifications, variations or the like). The exemplary portable system 510 of FIGS. 27-29 differs from the exemplary systems 10, 110, 210, 310 and 410 with respect to the attachment of the outer membrane 524 to the at least one container 512.

As shown in FIGS. 27-29, the system 510 includes a pair of sealing mounting plates 533 coupled (e.g., via welding, bolting or any other attachment mechanism) to portions of the outer face 524 of the container 512. The mounting plates 533 are configured to extend over the uneven outer face 524 of the container 512 and provide a planar/flat mounting surface. The mounting plates 533 thereby seal-off the depressions 521 in the uneven outer face 524 of the container 512, and provide a surface to which the outer membrane 514 can be coupled to such that the air pressure within the enclosure is prevented from escaping between the outer membrane 514 and the outer face 524 of the container 512, as shown in FIGS. 27-29. As shown in FIGS. 27-29, in some embodiments a pair of mounting plates 533 may be coupled over lateral side portions of the outer face 524 of the container 512 between the top and bottom sides of the container 512.

As also shown in FIGS. 27-29, a clamping member 528 can be coupled to the outer surface of the mounting plates 533 via mounting studs 525 as described above to seal the outer membrane 514 thereto. The clamping members 528 may thereby extend from the bottom edge of the mounting plates 533 and/or the outer face 524 of the container 512 to the top edge of the mounting plates 533 and/or the outer face 524 of the container 512, such as at an angle laterally inwardly, as shown in FIGS. 27-29. For example, as described above, the outer membrane 514 may extend between the clamping members 528 and the mounting plates 533 with the expanded edge (e.g., rope bead edge) on the outer lateral sides of the clamping members 528 (or the inner lateral sides thereof). The clamping members 528 can be compressed against the mounting plates 533 via the mounting studs 525 (as described above) to sealingly fix the outer membrane 514 therebetween (and to the container 512), as shown in FIGS. 27-29.

The outer membrane 514 is also sealingly coupled to the top side of the container 512. For example, in some embodiments a medial portion of the end portion of the outer membrane 514 may be coupled to a top frame portion 526 of the container 512, as shown in FIGS. 27-29. The top frame 536 of the container may be structurally supportive and form/include a planar outer surface to which the outer membrane 514 may be sealingly coupled via a clamping member 528 and mounting studs 525 (as described above) to seal the outer membrane 514 thereto. For example, as described above, the outer membrane 514 may extend between the clamping member 528 and the top frame portion 526 of the container 512 with the expanded edge (e.g., rope bead edge) on the outer inner side of the clamping member 528 (or the outer side thereof), as shown in FIGS. 27-29. The clamping member 528 can be compressed against the outer surface of the top frame portion 526 via the mounting studs 525 (as described above) to sealingly fix the outer membrane 514 therebetween (and to the container 512), as shown in FIGS. 27-29.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as referee labels, and are not intended to impose numerical, structural or other requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function cavity of further structure. It is to be understood that not necessarily all such objects or advantages described above may be achieved in accordance with any particular example. Thus, for example, those skilled in the art will recognize that the devices, systems and methods described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some disclosure are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

We claim:

1. An air supported structure system, comprising:
   at least one transportable container;
   a flexible outer membrane configured to couple to a base in a substantially air-tight manner; and
   at least one air handling mechanism contained within the at least one container configured to force air between the outer membrane and the base when the outer membrane is coupled to the base to form and maintain an enclosure therebetween via internal air pressure,
   wherein the system is configurable between a packaged state with the flexible outer membrane at least partially contained within the at least one container, and a deployed state with the flexible outer membrane being coupled to the base in the substantially air-tight manner and the at least one air handling mechanism forming and maintaining the enclosure via the internal air pressure,
   wherein, in the packaged state, the at least one transportable container forms a portion of the base, and
   wherein, in at least the deployed state, lateral side portions of an end portion of the outer membrane are coupled to mounting plates that extend over lateral portions of an outer side face of the at least one transportable container via lateral clamping members, and a medial portion of the end portion of the outer membrane positioned between the lateral portions of the end portion of the outer membrane is coupled to a top portion of the at least one transportable container via at least one medial clamping member.

2. The system of claim 1, wherein the at least one transportable container forms a portion of the enclosure in the deployed state.

3. The system of claim 1, wherein the base further comprises at least one of a ground surface of a particular location and a foundation structure.

4. The system of claim 1, wherein an entirety of the flexible outer membrane is contained within the at least one container in the packaged state.

5. The system of claim 1, comprising a plurality of transportable containers.

6. The system of claim 1, wherein the at least one air handling mechanism is further configured to at least one of selectively cool the forced air, selectively heat the forced air, selectively add substances to the forced air and selectively remove substances from the forced air.

7. The system of claim 1, wherein the at least one air handling mechanism is operable via electrical power, and further comprising an electrical power generating mechanism configured to provide electrical power to the at least one air handling mechanism.

8. The system of claim 7, wherein the electrical power generating mechanism is contained within at least one of the transportable containers at least in the packaged state.

9. The system of claim 1, wherein the lateral portions of the outer side face of the at least one transportable container comprises an uneven surface, wherein the mounting plates extend over the lateral portions of the outer side face and form planar mounting surfaces, and wherein the top side surface of the top frame portion of the at least one container comprises a planar mounting surface.

10. The system of claim 9, wherein the lateral side portions of the end portion of the outer membrane are compressed between the planar mounting surfaces of the mounting plates and the lateral clamping members, and wherein the medial portion of the end portion of the outer membrane is clamped between the planar mounting surface of the top frame portion and the medial clamping member.

11. The system of claim 10, wherein a plurality of lateral threaded mounting studs extend from the planar mounting surfaces of the mounting plates and through the lateral clamping members, and a plurality of medial threaded mounting studs extend from the planar mounting surface of the top frame portion and through the medial clamping member, and wherein a plurality of nuts are threadably coupled to the plurality of lateral threaded mounting studs to exert a clamping force to the lateral clamping members, and a plurality of nuts are threadably coupled to the plurality of medial threaded mounting studs to exert a clamping force to the medial clamping member.

12. The system of claim 1, wherein, in the deployed state, the at least one transportable container includes a passageway in communication with the enclosure in the deployed state.

13. The system of claim 12, wherein the passageway is in direct communication with the enclosure in the deployed state.

14. The system of claim 12, wherein the passageway is in communication with an intermediate structure that is in communication with the enclosure in the deployed state.

15. A method of forming an air supported structure that forms an enclosure via internal pressured air, comprising:
    transporting at least one container of an air supported structure system in a packaged state to a location, the at least one container including at least one air handling mechanism positioned within the at least one container and a flexible outer membrane positioned within the at least one container configured to couple to a base;
    at least partially removing the outer membrane from within the at least one container;
    coupling the outer membrane to a base in a substantially air-tight manner, the at least one container forming a portion of the base; and
    forcing air between the outer membrane and the base via the at least one air handling mechanism to form and maintain the enclosure therebetween via internal air pressure,
    wherein coupling the outer membrane to the base comprises lateral side portions of an end portion of the outer membrane to mounting plates that extend over lateral portions of an outer side face of the at least one transportable container via lateral clamping members, and coupling a medial portion of the end portion of the outer membrane positioned between the lateral portions of the end portion of the outer membrane to a top portion of the at least one transportable container via at least one medial clamping member.

16. The method of claim 15, wherein the base further comprises at least one of a ground surface of a location and a foundation extending from the ground surface, and wherein coupling the outer membrane to the base comprises coupling at least one second portion of the outer membrane to at least one of the ground surface and the foundation in a substantially air-tight manner.

17. The method of claim 15, wherein at least one of the containers includes a passageway in communication with the enclosure.

18. The method of claim 15, wherein the at least one air handling mechanism is operable via electrical power, and wherein the system further comprises an electrical power generating mechanism positioned within the at least one container.

19. The method of claim 15, wherein the at least one air handling mechanism is further configured to at least one of selectively cool the forced air, selectively warm the forced air, and selectively remove pollutants from the forced air.

\* \* \* \* \*